US012483430B2

(12) United States Patent
Hwang et al.

(10) Patent No.: US 12,483,430 B2
(45) Date of Patent: Nov. 25, 2025

(54) PHYSICALLY UNCLONABLE DEVICE, AND SIGNAL PROCESSING DEVICE AND IMAGE DISPLAY DEVICE HAVING SAME

(71) Applicant: LG ELECTRONICS INC., Seoul (KR)

(72) Inventors: Eujin Hwang, Seoul (KR); Sangduk Yu, Seoul (KR); Sanghoon Choi, Seoul (KR); Kwangchoong Kim, Seoul (KR); Sungwoon Moon, Seoul (KR); Sungwook Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 18/030,456

(22) PCT Filed: Aug. 24, 2021

(86) PCT No.: PCT/KR2021/011269
§ 371 (c)(1),
(2) Date: Apr. 5, 2023

(87) PCT Pub. No.: WO2022/075585
PCT Pub. Date: Apr. 14, 2022

(65) Prior Publication Data

US 2023/0379176 A1 Nov. 23, 2023

(30) Foreign Application Priority Data

Oct. 5, 2020 (KR) ........................ 10-2020-0127986
Oct. 5, 2020 (KR) ........................ 10-2020-0127987

(51) Int. Cl.
*H04L 9/32* (2006.01)

(52) U.S. Cl.
CPC .................................. *H04L 9/3278* (2013.01)

(58) Field of Classification Search
CPC ............................... H04L 9/3278; H02M 1/08
See application file for complete search history.

(56) References Cited

U.S. PATENT DOCUMENTS

2012/0081143 A1 4/2012 Behrends et al.
2015/0326918 A1* 11/2015 Oh ..................... H04N 21/4363 348/445
2023/0370289 A1* 11/2023 Moon ................... H04L 9/0866

FOREIGN PATENT DOCUMENTS

JP 2018-136757 8/2018
KR 10-2017-0094326 8/2017
(Continued)

OTHER PUBLICATIONS

PCT International Application No. PCT/KR2021/011269, International Search Report dated Dec. 17, 2021, 4 pages.

*Primary Examiner* — Kyle J Moody
(74) *Attorney, Agent, or Firm* — LEE, HONG, DEGERMAN, KANG & WAIMEY

(57) ABSTRACT

A physically unclonable device according to an embodiment of the present disclosure comprises: a plurality of inverters disposed on a first path to which a first signal is input; a plurality of inverters disposed on a second path to which a second signal is input; a first MOS capacitor disposed on the first path; and a second MOS capacitor disposed on the second path, wherein a first voltage is applied to a MOS capacitor located on the path corresponding to whichever of the first signal or the second signal arrives later at an output terminal of the first path or an outer terminal of the second path. Accordingly, a physically unclonable device that does not require separate error correction can be achieved.

20 Claims, 18 Drawing Sheets

(56) References Cited

FOREIGN PATENT DOCUMENTS

| | | |
|---|---|---|
| KR | 10-2018-0128779 | 12/2018 |
| WO | 2017-186816 | 11/2017 |

* cited by examiner

FIG. 9A

| ORDER OF ARRIVAL | SIGNAL T2 | Q1 | Q2 | Res |
|---|---|---|---|---|
| T1 | 0 | High | Low | High |
| | X | random | High | High |
| T2 | 0 | Low | Low | Low |

FIG. 9B

| Temp(℃) | 27 | 125 | 125 | -40 | -40 |
|---|---|---|---|---|---|
| Vdd(V) | 0.8 | 0.88 | 0.72 | 0.88 | 0.72 |
| 10 Mohm | 0.9% | 11.9% | 0.4% | 4% | 0% |
| 1 Mohm | 0% | 0% | 0% | 0% | 0% |
| 500 kohm | 0% | 0% | 0% | 0% | 0% |

PHYSICALLY UNCLONABLE DEVICE, AND SIGNAL PROCESSING DEVICE AND IMAGE DISPLAY DEVICE HAVING SAME

CROSS-REFERENCE TO RELATED APPLICATIONS

This application is the National Stage filing under 35 U.S.C. 371 of International Application No. PCT/KR2021/011269, filed on Aug. 24, 2021, which claims the benefit of earlier filing date and right of priority to Korean Application Nos. 10-2020-0127986, filed on Oct. 5, 2020, and 10-2020-0127987, filed on Oct. 5, 2020, the contents of which are all incorporated by reference herein in their entirety.

BACKGROUND

1. Field

The present disclosure relates to a physically unclonable function device, and a signal processing device and an image display apparatus including the same, and more particularly to a physically unclonable function device that requires no separate error correction, and a signal processing device and an image display apparatus including the physically unclonable function device.

2. Description of the Related Art

A physically unclonable function (PUF) is a technology for generating secure keys with unclonable unique chips based on mismatch between circuit elements in a semiconductor manufacturing process.

However, if a bit error occurs with different results in case in which an external environment, e.g., temperature, voltage, etc., changes, it is required to correct the error.

U.S. Pat. No. 9,489,504 (hereinafter referred to a related art) discloses a PUF circuit using ring oscillators.

However, in the related art, if external temperature or power voltage changes, bit may be flipped from a high state to a low state, or vice versa. The related art has a drawback in that in order to correct the flipped bit error, an additional circuit, such as an Error correction code (ECC) or a non-volatile Memory (NVM) is required.

SUMMARY

It is an objective of the present disclosure to provide a physically unclonable function (PUF) device that requires no separate error correction, and a signal processing device and an image display apparatus including the PUF device.

It is another objective of the present disclosure to provide a PUF device that is antifuse-based and requires no separate error correction, and a signal processing device and an image display apparatus including the PUF device.

It is further another objective of the present disclosure to provide a PUF device capable of outputting the same bit even in case in which the external environment changes, and a signal processing device and an image display apparatus including the PUF device.

According to an aspect of the present disclosure, a physically unclonable function (PUF) device, and a signal processing device and an image display apparatus including the same according to an embodiment of the present disclosure include: a plurality of inverters disposed on a first path to which a first signal is input; a plurality of inverters disposed on a second path to which a second signal is input: a first MOS capacitor disposed on the first path; and a second MOS capacitor disposed on the second path, wherein a first voltage is applied to a MOS capacitor disposed on a path corresponding to whichever of the first signal and the second signal arrives later at an output terminal of the first path or an output terminal of the second path.

Meanwhile, the PUF device, and the signal processing device and the image display apparatus including the same according to an embodiment of the present disclosure may further include a voltage output device configured to supply the first voltage to the MOS capacitor disposed on the path corresponding to whichever of the first signal and the second signal arrives later at the output terminal of the first path or the output terminal of the second path.

Meanwhile, the PUF device, and the signal processing device and the image display apparatus including the same according to an embodiment of the present disclosure may further include: at least one resistor disposed on the first path; and at least one resistor disposed on the second path.

Meanwhile, the first MOS capacitor may be disposed between the plurality of inverters on the first path, and the second MOS capacitor may be disposed between the plurality of inverters on the second path.

Meanwhile, a first inverter and a second inverter may be disposed on the first path, and the first MOS capacitor may be disposed between the first inverter and the second inverter; and a third inverter and a fourth inverter may be disposed on the second path, and the second MOS capacitor is disposed between the third inverter and the fourth inverter.

Meanwhile, the PUF device, and the signal processing device and the image display apparatus including the same according to an embodiment of the present disclosure may further include a flip-flop disposed at the output terminal of the first path and the output terminal of the second path, wherein a signal output from the output terminal of the first path may be input as an input signal to the flip-flop, and a signal output from the output terminal of the second path may be input as a clock signal to the flip-flop.

Meanwhile, the PUF device, and the signal processing device and the image display apparatus including the same according to an embodiment of the present disclosure may further include a flip-flop disposed at the output terminal of the first path and the output terminal of the second path, wherein, based on an output signal of the flip-flop, the voltage output device may supply the first voltage to the MOS capacitor disposed on the path corresponding to whichever of the first signal and the second signal arrives later at the output terminal of the first path or the output terminal of the second path.

Meanwhile, the voltage output device may be configured to: in response to the second signal arriving later at the output terminal of the first path or the output terminal of the second path than the first signal, supply the first voltage to the second MOS capacitor; and in response to the first signal arriving later at the output terminal of the first path or the output terminal of the second path than the second signal, supply the first voltage to the first MOS capacitor.

Meanwhile, in response to the second signal arriving later at the output terminal of the first path or the output terminal of the second path than the first signal, the voltage output device may supply the first voltage to the second MOS capacitor, wherein, after the first voltage is supplied, in response to the first signal and the second signal being supplied to the first path and the second path, respectively, a difference in time of arrival between the second signal and the first signal, which arrive at the output terminal of the first path or the output terminal of the second path, may further increase.

Meanwhile, in response to the first signal arriving later at the output terminal of the first path or the output terminal of the second path than the second signal, the voltage output device may supply the first voltage to the first MOS capacitor, wherein, after the first voltage is supplied, in response to the first signal and the second signal being supplied to the first path and the second path, respectively, a difference in time of arrival between the first signal and the second signal, which arrive at the output terminal of the first path or the output terminal of the second path, may further increase.

Meanwhile, the first signal and the second signal may be identical pulse signals.

Meanwhile, the PUF device, and the signal processing device and the image display apparatus including the same may further include: a flip-flop disposed at the output terminal of the first path and the output terminal of the second path; at least one inverter disposed on a third path to which a third signal is input; a second flip-flop disposed at an output terminal of the third path; and an OR gate configured to perform a logical operation based on an output signal of the flip-flop and an output signal of the second flip-flop.

Meanwhile, an output signal of the inverter connected to the output terminal of the second path may be input as an input signal to the second flip-flop; and a signal output from the output terminal of the third path may be input as a clock signal to the second flip-flop.

Meanwhile, in response to the flip-flop outputting a random signal after the first voltage is applied to the second MOS capacitor, the OR gate may output a logic-operated signal based on the output signal of the second flip-flop.

Meanwhile, in response to the flip-flop outputting a random signal after the first voltage is applied to the second MOS capacitor, the second flip-flop may output a high-level signal, and the OR gate may output a high-level signal.

Meanwhile, in response to the first voltage being applied to the second MOS capacitor, the flip-flop may output a high-level signal, the second flip-flop may output a low-level signal, and the OR gate may output a high-level signal.

Meanwhile, in response to the first voltage being applied to the first MOS capacitor, the flip-flop may output a low-level signal, the second flip-flop may output a low-level signal, and the OR gate may output a low-level signal.

Meanwhile, a physically unclonable function (PUF) device, and a signal processing device and an image display apparatus including the same according to another embodiment of the present disclosure include: a plurality of inverters disposed on a first path to which a first signal is input; a plurality of inverters disposed on a second path to which a second signal is input: a first MOS capacitor disposed on the first path; a second MOS capacitor disposed on the second path; a flip-flop disposed at an output terminal of the first path and an output terminal of the second path; at least one inverter disposed on a third path to which a third signal is input; an inverter connected to the output terminal of the second path; a second flip-flop disposed at an output terminal of the third path; and an OR gate configured to perform a logical operation based on an output signal of the flip-flop and an output signal of the second flip-flop.

Meanwhile, the first to third signals may be identical pulse signals.

Effects of the Disclosure

A physically unclonable function (PUF) device, and a signal processing device and an image display apparatus including the same according to an embodiment of the present disclosure include: a plurality of inverters disposed on a first path to which a first signal is input; a plurality of inverters disposed on a second path to which a second signal is input: a first MOS capacitor disposed on the first path; and a second MOS capacitor disposed on the second path, wherein a first voltage is applied to a MOS capacitor disposed on a path corresponding to whichever of the first signal and the second signal arrives later at an output terminal of the first path or an output terminal of the second path. Accordingly, a PUF device requiring no separate error correction may be implemented. Particularly, a PUF device that is antifuse-based and requires no separate error correction may be implemented.

Meanwhile, the PUF device, and the signal processing device and the image display apparatus including the same according to an embodiment of the present disclosure may further include a voltage output device configured to supply the first voltage to the MOS capacitor disposed on the path corresponding to whichever of the first signal and the second signal arrives later at the output terminal of the first path or the output terminal of the second path. Accordingly, the PUF device requiring no separate error correction may be implemented. Particularly, the PUF device that is antifuse-based and requires no separate error correction may be implemented.

Meanwhile, the PUF device, and the signal processing device and the image display apparatus including the same according to an embodiment of the present disclosure may further include: at least one resistor disposed on the first path; and at least one resistor disposed on the second path. Accordingly, the PUF device requiring no separate error correction may be implemented by using a damping circuit.

Meanwhile, the first MOS capacitor may be disposed between the plurality of inverters on the first path, and the second MOS capacitor may be disposed between the plurality of inverters on the second path. Accordingly, the PUF device requiring no separate error correction may be implemented by using the damping circuit.

Meanwhile, a first inverter and a second inverter may be disposed on the first path, and the first MOS capacitor may be disposed between the first inverter and the second inverter; and a third inverter and a fourth inverter may be disposed on the second path, and the second MOS capacitor is disposed between the third inverter and the fourth inverter. Accordingly, the PUF device requiring no separate error correction may be implemented by using the damping circuit.

Meanwhile, the PUF device, and the signal processing device and the image display apparatus including the same according to an embodiment of the present disclosure may further include a flip-flop disposed at the output terminal of the first path and the output terminal of the second path, wherein a signal output from the output terminal of the first path may be input as an input signal to the flip-flop, and a signal output from the output terminal of the second path may be input as a clock signal to the flip-flop. Accordingly, the PUF device requiring no separate error correction may be implemented.

Meanwhile, the PUF device, and the signal processing device and the image display apparatus including the same according to an embodiment of the present disclosure may further include a flip-flop disposed at the output terminal of the first path and the output terminal of the second path, wherein, based on an output signal of the flip-flop, the voltage output device may supply the first voltage to the MOS capacitor disposed on the path corresponding to whichever of the first signal and the second signal arrives later at the output terminal of the first path or the output terminal of the second path. Accordingly, the PUF device requiring no separate error correction may be implemented. Particularly, the PUF device that is antifuse-based and requires no separate error correction may be implemented.

Meanwhile, the voltage output device may be configured to: in response to the second signal arriving later at the output terminal of the first path or the output terminal of the second path than the first signal, supply the first voltage to the second MOS capacitor; and in response to the first signal arriving later at the output terminal of the first path or the output terminal of the second path than the second signal, supply the first voltage to the first MOS capacitor. Accordingly, the PUF device requiring no separate error correction may be implemented. Particularly, the PUF device that is antifuse-based and requires no separate error correction may be implemented.

Meanwhile, in response to the second signal arriving later at the output terminal of the first path or the output terminal of the second path than the first signal, the voltage output device may supply the first voltage to the second MOS capacitor, wherein, after the first voltage is supplied, in response to the first signal and the second signal being supplied to the first path and the second path, respectively, a difference in time of arrival between the second signal and the first signal, which arrive at the output terminal of the first path or the output terminal of the second path, may further increase. Accordingly, the PUF device requiring no separate error correction may be implemented. Particularly, the PUF device that is antifuse-based and requires no separate error correction may be implemented.

Meanwhile, in response to the first signal arriving later at the output terminal of the first path or the output terminal of the second path than the second signal, the voltage output device may supply the first voltage to the first MOS capacitor, wherein, after the first voltage is supplied, in response to the first signal and the second signal being supplied to the first path and the second path, respectively, a difference in time of arrival between the first signal and the second signal, which arrive at the output terminal of the first path or the output terminal of the second path, may further increase. Accordingly, the PUF device requiring no separate error correction may be implemented. Particularly, the PUF device that is antifuse-based and requires no separate error correction may be implemented.

Meanwhile, the PUF device, and the signal processing device and the image display apparatus including the same may further include: a flip-flop disposed at the output terminal of the first path and the output terminal of the second path; at least one inverter disposed on a third path to which a third signal is input; a second flip-flop disposed at an output terminal of the third path; and an OR gate configured to perform a logical operation based on an output signal of the flip-flop and an output signal of the second flip-flop. Accordingly, the PUF device requiring no separate error correction may be implemented. Particularly, the PUF device that is antifuse-based and requires no separate error correction may be implemented. Meanwhile, the same bit may be output constantly even in case in which the external environment changes.

Meanwhile, an output signal of the inverter connected to the output terminal of the second path may be input as an input signal to the second flip-flop; and a signal output from the output terminal of the third path may be input as a clock signal to the second flip-flop. Accordingly, the PUF device requiring no separate error correction may be implemented.

Meanwhile, in response to the flip-flop outputting a random signal after the first voltage is applied to the second MOS capacitor, the OR gate may output a logic-operated signal based on the output signal of the second flip-flop. Accordingly, the PUF device requiring no separate error correction may be implemented.

Meanwhile, in response to the flip-flop outputting a random signal after the first voltage is applied to the second MOS capacitor, the second flip-flop may output a high-level signal, and the OR gate may output a high-level signal. Accordingly, the PUF device requiring no separate error correction may be implemented.

Meanwhile, in response to the first voltage being applied to the second MOS capacitor, the flip-flop may output a high-level signal, the second flip-flop may output a low-level signal, and the OR gate may output a high-level signal. Accordingly, the PUF device requiring no separate error correction may be implemented.

Meanwhile, in response to the first voltage being applied to the first MOS capacitor, the flip-flop may output a low-level signal, the second flip-flop may output a low-level signal, and the OR gate may output a low-level signal. Accordingly, the PUF device requiring no separate error correction may be implemented.

Meanwhile, a physically unclonable function (PUF) device, and a signal processing device and an image display apparatus including the same according to another embodiment of the present disclosure include: a plurality of inverters disposed on a first path to which a first signal is input; a plurality of inverters disposed on a second path to which a second signal is input: a first MOS capacitor disposed on the first path; a second MOS capacitor disposed on the second path; a flip-flop disposed at an output terminal of the first path and an output terminal of the second path; at least one inverter disposed on a third path to which a third signal is input; an inverter connected to the output terminal of the second path; a second flip-flop disposed at an output terminal of the third path; and an OR gate configured to perform a logical operation based on an output signal of the flip-flop and an output signal of the second flip-flop. Accordingly, the PUF device requiring no separate error correction may be implemented. Particularly, the PUF device that is antifuse-based and requires no separate error correction may be implemented. Meanwhile, the same bit may be output constantly even in case in which the external environment changes.

DETAILED DESCRIPTION OF THE PREFERRED EMBODIMENTS

Hereinafter, the present disclosure will be described in detail with reference to the accompanying drawings.

As used herein, the suffixes "module" and "unit" are added to simply facilitate preparation of this specification and are not intended to suggest special meanings or functions. Therefore, the suffixes "module" and "unit" may be used interchangeably.

Figure 1:
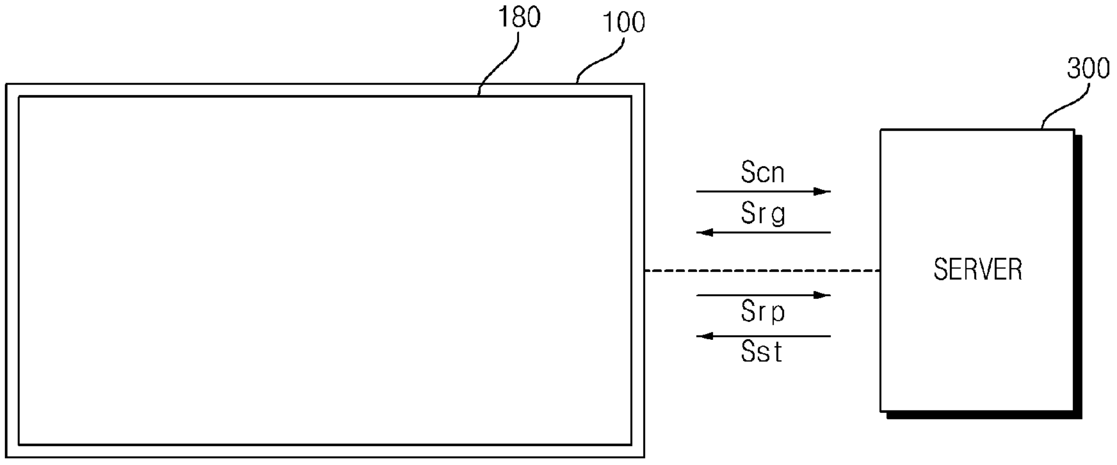
FIG. 1 is a diagram illustrating an image display apparatus according to an embodiment of the present disclosure.

FIG. 1 is a diagram illustrating an image display apparatus according to an embodiment of the present disclosure.

Referring to the drawing, an image display apparatus 100 may include a display 180.

Meanwhile, the display 180 may be implemented as one of various panels. For example, the display 180 may be any one of a liquid crystal display (LCD) panel, an organic light emitting diode panel (OLED panel), an inorganic light emitting diode panel (LED panel), and the like.

Meanwhile, the image display apparatus 10 may further include a signal processing device (170 of FIG. 2) configured to perform signal processing for image display on the display 180.

The signal processing device 170 may be implemented in the form of a system on chip (SOC).

Meanwhile, an external server 300 may transmit or stream predetermined information or video data to the image display apparatus 100.

For example, if the image display apparatus 100 is connected to the external server 300, the image display apparatus 100 may transmit an access request signal Scn to the external server 300, and the external server 300 may transmit an authentication request signal Srg to the image display apparatus 100.

In response, the image display apparatus 100 may transmit an encryption key data Srp to the external server 300, and in case in which authentication is completed based on the encryption key data Srp, the image display apparatus 100 may transmit the access request signal Scn to the external server 300 and may transmit or stream predetermined information or video data Sst.

In this case, the encryption key data Srp is preferably data to which a physically unclonable function (PUF) based on hardware rather than software is applied, and thus cannot be duplicated.

Meanwhile, in case in which a circuit based on the PUF is implemented, it is preferable to implement a PUF device that is robust and requires no separate error correction even in case in which external temperature or power voltage changes.

To this end, a PUF device 600 according to an embodiment of the present disclosure includes a plurality of inverters 605*a* and 605*b* which are disposed in a partial area of the signal processing device 170, are disposed on a first path PATH1, and to which a first signal T1 is input, a plurality of inverters 605*c* and 605*d* which are disposed on a second path PATH2 and to which a second signal T2 is input, a first MOS capacitor TRa disposed on the first path PATH1, and a second MOS capacitor TRb disposed on the second path PATH2.

Further, a first voltage V1 is applied to a MOS capacitor disposed on a path corresponding to whichever of the first signal T1 and the second signal T2 arrives later at an output terminal OTa of the first path PATH1 or an output terminal OTb of the second path PATH2. Accordingly, the PUF device 600 requiring no separate error correction may be implemented. Particularly, the PUF device 600 that is anti-fuse-based and requires no separate error correction may be implemented.

Meanwhile, the image display apparatus 100 of FIG. 1 may be a TV receiver, a monitor, a tablet, a mobile terminal, a vehicle display device, a commercial display device, signage or the like.

Figure 2:
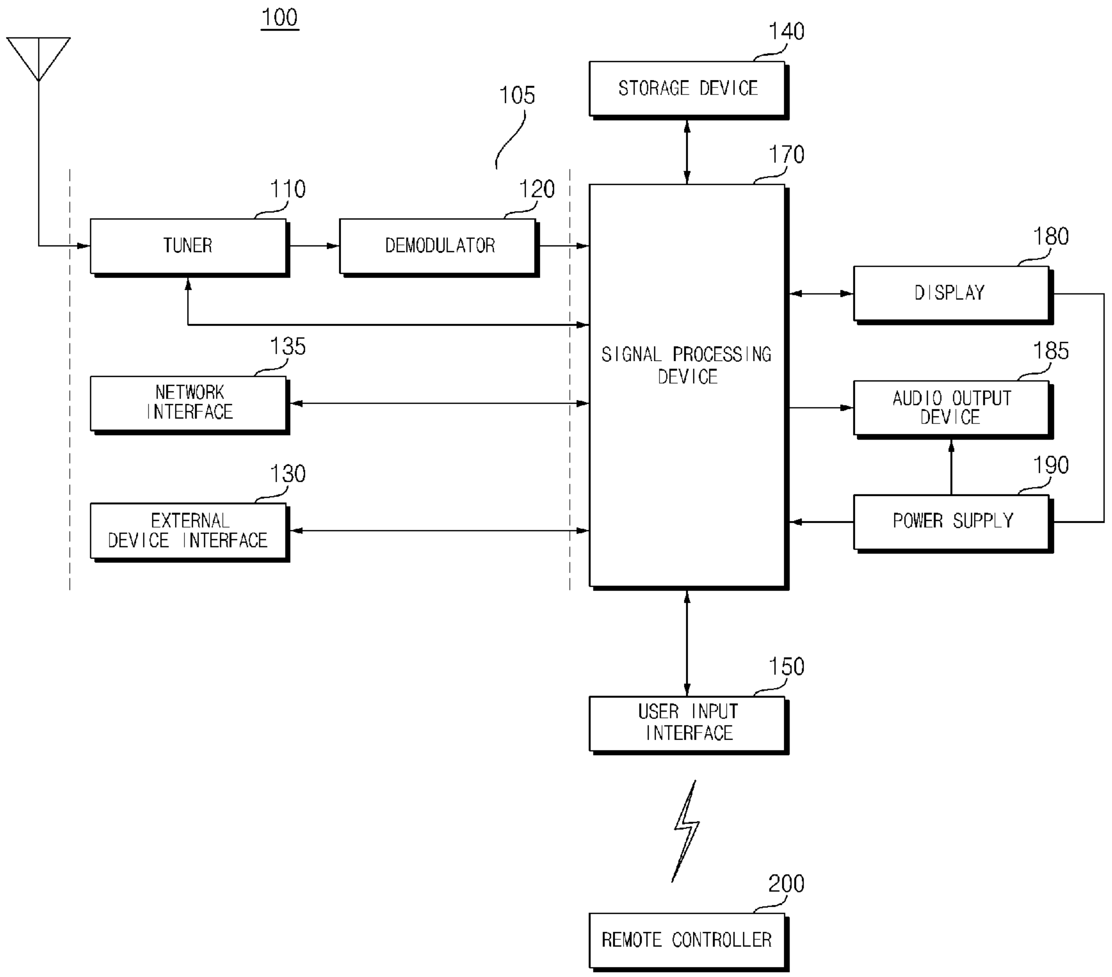
FIG. 2 is an internal block diagram illustrating an image display apparatus of FIG. 1.

FIG. 2 is an internal block diagram illustrating the image display apparatus of FIG. 1.

Referring to FIG. 2, the image display apparatus 100 according to one embodiment of the present disclosure may include an image receiver 105, an external device interface 130, a storage device 140, a user input interface 150, a sensor device (not shown), a signal processing device 170, a display 180, and an audio output device 185.

The image receiver 105 may include a tuner 110, a demodulator 120, a network interface 130, and an external device interface 130.

Meanwhile, unlike the drawing, the image receiver 105 may include only the tuner 110, the demodulator 120, the external device interface 130. That is, the network interface 130 may not be included.

The tuner 110 selects a channel selected by a user from among radio frequency (RF) broadcast signals received through an antenna (not illustrated) or an RF broadcast signal corresponding to all pre-stored channels. In addition, the tuner 110 converts the selected RF broadcast signal into a middle-frequency signal, a baseband image, or a voice signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 may process a digital broadcast signal or an analog broadcast signal. The analog baseband image or audio signal (CVBS/SIF) output from the tuner 110 may be directly input to the signal processing device 170.

Meanwhile, the tuner 110 can include a plurality of tuners for receiving broadcast signals of a plurality of channels. Alternatively, a single tuner that simultaneously receives broadcast signals of a plurality of channels is also available.

The demodulator 120 receives and demodulates a digital IF (DIF) signal converted by the tuner 110.

After performing demodulation and channel decoding, the demodulator 120 may output a stream signal (TS). Herein, the stream signal may be a signal obtained by multiplexing an image signal, voice signal or data signal.

The stream signal output from the demodulator 120 may be input to the signal processing device 170. After performing demultiplexing and image/voice signal processing, the signal processing device 170 outputs an image to the display 180 and voice to the audio output device 185.

The external device interface 130 may transmit or receive data to or from a connected external device (not illustrated), for example, a set-top box 50. To this end, the external interface 130 may include an A/V input/output device.

The external device interface 130 may be connected to external devices such as a digital versatile disc (DVD) player, a Blu-ray player, a gaming device, a camera, a camcorder, a computer (laptop), and a set-top box in a wired/wireless manner, and perform input/output operations with external devices.

The A/V input/output device may receive image and voice signals of the external device. Meanwhile, a wireless transceiver (not shown) may perform short-range wireless communication with other electronic devices.

The external device interface 130 may exchange data with a neighboring mobile terminal 600 via the wireless transceiver (not illustrated). In particular, in the mirroring mode, the external device interface 130 may receive device information, information about an executed application and an application image from the mobile terminal 600.

The network interface 135 provides an interface for connecting the image display apparatus to a wired/wireless network including the Internet. For example, the network interface 135 may receive content or data provided by the Internet or a content provider or network operator through a network.

The network interface 135 may include a wireless transceiver (not illustrated).

The storage device 140 may store programs for processing and control of signals in the signal processing device 170, and also store a signal-processed image, voice signal or data signal.

The storage device 140 may function to temporarily store an image signal, a voice signal, or a data signal input through the external device interface 130. In addition, the storage device 140 may store information about a predetermined broadcast channel through the channel memorization function such as a channel map.

While it is illustrated in FIG. 2 that the storage device 140 is provided separately from the signal processing device 170, embodiments of the present disclosure are not limited thereto. The storage device 140 may be included in the signal processing device 170.

The user input interface 150 may transmit a signal input by the user to the signal processing device 170 or transmit a signal from the signal processing device 170 to the user.

For example, the user input interface 150 may transmit/receive user input signals such as power on/off, channel selection, and screen setting to/from the remote controller 200, deliver user input signals input through local keys (not illustrated) such as a power key, a channel key, a volume key, or a setting key, deliver user input signals input through a sensor device (not illustrated) to sense user gestures to the signal processing device 170, or transmit a signal from the signal processing device 170 to the sensor device (not illustrated).

The signal processing device 170 may demultiplex streams input through the tuner 110, demodulator 120, network interface 135, or external device interface 130, or process demultiplexed signals. Thereby, the signal processing device 170 may generate an output signal for outputting an image or voice.

For example, the signal processing device 170 may receive a broadcast signal or HDMI signal received from the image receiver 105, perform signal processing based on the received broadcast signal or HDMI signal, and output the signal-processed image signal.

An image signal image-processed by the signal processing device 170 may be input to the display 180 and an image corresponding to the image signal may be displayed. In addition, the image signal which is image-processed by the signal processing device 170 may be input to an external output device through the external device interface 130.

A voice signal processed by the signal processing device 170 may be output to the audio output device 185 in the form of sound. In addition, the voice signal processed by the signal processing device 170 may be input to an external output device through the external device interface 130.

Although not illustrated in FIG. 2, the signal processing device 170 may include a demultiplexer, an image processor, and the like. That is, the signal processing device 170 may perform various signal processing, and thus may be implemented in the form of a System On Chip (SOC). This will be described later with reference to FIG. 3.

Additionally, the signal processing device 170 may control overall operation of the image display apparatus 100. For example, the signal processing device 170 may control the tuner 110 to tune to an RF broadcast corresponding to a channel selected by the user or a pre-stored channel.

The signal processing device 170 may control the image display apparatus 100 according to a user command input through the user input interface 150 or an internal program.

The signal processing device 170 may control the display 180 to display an image. Herein, the image displayed on the display 180 may be a still image, a moving image, a 2D image, or a 3D image.

The signal processing device 170 may be configured to display the predetermined object in an image displayed on the display 180. For example, the object may be at least one of an accessed web page (a newspaper, a magazine, or the like), electronic program guide (EPG), various menus, a widget, an icon, a still image, a moving image, or text.

The signal processing device 170 may recognize the location of the user based on an image captured by a capture device (not illustrated). For example, the signal processing device 170 may recognize a distance (a z-axis coordinate) between the user and the image display apparatus 100. Additionally, the signal processing device 170 may recognize an x-axis coordinate and a y-axis coordinate corresponding to the location of the user in the display 180.

The display 180 generates drive signals by converting an image signal, data signal, OSD signal, and control signal processed by the signal processing device 170 or an image signal, data signal, and control signal received from the external device interface 130.

The display 180 may be configured as a touch screen and used as an input device in addition to an output device.

The audio output device 185 receives a voice signal processed by the signal processing device 170 and outputs voice.

The capture device (not illustrated) captures the user. The capture device (not illustrated) may be implemented with one camera, but is not limited thereto, and may be implemented with a plurality of cameras. Image information captured by the capture device (not illustrated) may be input to the signal processing device 170.

The signal processing device 170 may sense user gestures based on an image captured by the capture device (not illustrated), a sensed signal from the sensor device (not illustrated), or a combination thereof.

The power supply 190 supplies corresponding power throughout the image display apparatus 100. In particular, the power supply 190 may supply power to the signal processing device 170 implemented in the form of a System On Chip (SOC), the display 180 for displaying images, an audio output device 185 for outputting audio, or the like.

Specifically, the power supply 190 may include a AC-DC converter to convert alternating current (AC) voltage into direct current (DC) voltage and a DC-DC converter to change the level of the DC voltage.

The remote controller 200 transmits user input to the user input interface 150. To this end, the remote controller 200 may employ Bluetooth, radio frequency (RF) communication, infrared (IR) communication, ultra-wideband (UWB), or ZigBee. In addition, the remote controller 200 may receive an image signal, a voice signal, or a data signal output from the user input interface 150, and display the signals on the remote controller 200 or voice-output.

The image display apparatus 100 may be a fixed or mobile digital broadcast receiver capable of receiving digital broadcast services.

The block diagram of the image display apparatus 100 illustrated in FIG. 2 is a block diagram for one embodiment of the present disclosure. Constituents of the block diagram may be integrated, added or omitted according to the specifications of the image display apparatus 100 which is implemented in reality. That is, two or more constituents may be combined into one constituent, or one constituent may be subdivided into two or more constituents, in case in which necessary. In addition, the function performed in each block is simply illustrative, and it should be noted that specific operations or devices of the blocks do not limit the scope of the present disclosure.

Figure 3:
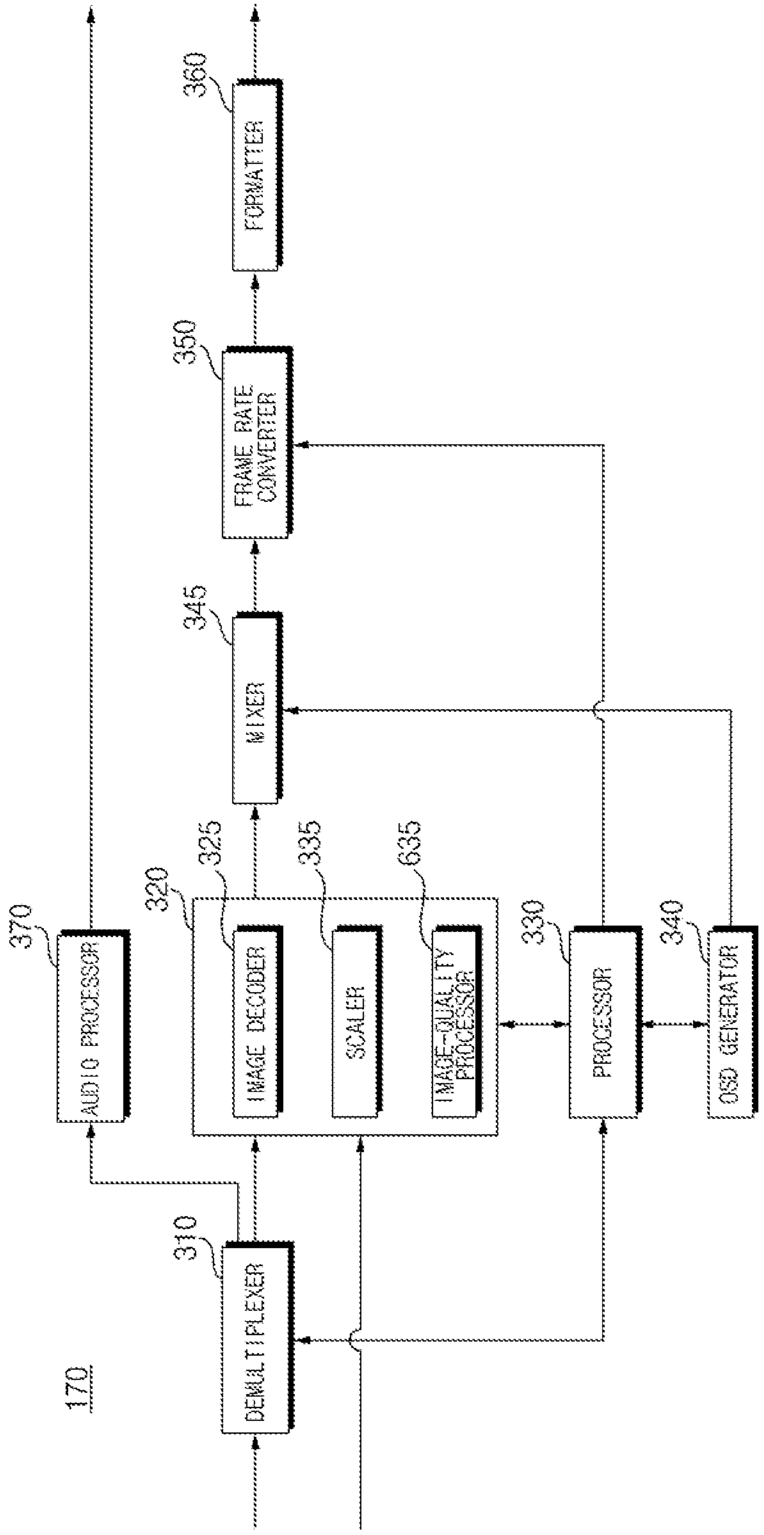
FIG. 3 is an internal block diagram illustrating a signal processing device of FIG. 2.

FIG. 3 is an internal block diagram illustrating the signal processing device of FIG. 2.

Referring to the drawings, the signal processing device 170 according to one embodiment of the present disclosure may include a demultiplexer 310, an image processor 320, a processor 330, and an audio processor 370. In addition, the signal processing device 170 may further include a data processor (not illustrated).

The demultiplexer 310 demultiplexes an input stream. For example, in case in which an MPEG-2 TS is input, the demultiplexer 310 may demultiplex the MPEG-2 TS to separate the MPEG-2 TS into an image signal, a voice signal and a data signal. Herein, the stream signal input to the demultiplexer 310 may be a stream signal output from the tuner 110, the demodulator 120 or the external device interface 130.

The image processor 320 may perform signal processing on an input image. For example, the image processor 320 may perform image processing of an image signal demultiplexed by the demultiplexer 310.

To this end, the image processor 320 includes an image decoder 325, a scaler 335, an image-quality processor 635, an image encoder (not illustrated), an OSD processor 340, a frame rate converter 350, and a formatter 360, and the like.

The image decoder 325 decodes the demultiplexed image signal, and the scaler 335 scales the resolution of the decoded image signal such that the image signal can be output through the display 180.

The image decoder 325 may include decoders of various standards. For example, the image decoder 325 may include an MPEG-2 decoder, an H.264 decoder, a 3D image decoder for color images and depth images, and a decoder for multi-viewpoint images.

The scaler 335 may scale an input image signal that has been image decoded by the image decoder 325 or the like.

For example, the scaler 335 may perform up-scaling in case in which the size or resolution of the input image signal is small, and down-scaling in case in which the size or resolution of the input image signal is large.

The image-quality processor 635 may perform image quality processing on an input image signal that has been image decoded in the image decoder 325 or the like.

For example, the image-quality processor 635 may perform noise removal processing of the input image signal, expand the resolution of gray levels of an input image signal, improve image resolution, perform high dynamic range (HDR) based signal processing, change the frame rate, or perform image quality processing corresponding to panel characteristics, particularly organic light emitting panels or the like.

The OSD processor 340 generates an OSD signal automatically or according to user input. For example, the OSD processor 340 may generate a signal for display of various kinds of information in the form of images or text on the screen of the display 180 based on a user input signal. The generated OSD signal may include various data including the user interface screen window of the image display apparatus 100, various menu screen windows, widgets, and icons. The generated OSD signal may also include a 2D object or a 3D object.

The OSD processor 340 may generate a pointer which can be displayed on the display, based on a pointing signal input from the remote controller 200. In particular, the pointer may be generated by a pointing signal processing device (not illustrated), and the OSD processor 340 may include the pointing signal generator. Of course, it is possible to provide the pointing signal processing device (not illustrated) separately from the OSD processor 340.

The frame rate converter (FRC) 350 may convert the frame rate of an input image. The FRC 350 may output frames without performing separate frame rate conversion.

The formatter 360 may change the format of an input image signal into an image signal for display on a display and output the changed image signal.

In particular, the formatter 360 may change the format of the image signal to correspond to the display panel.

Meanwhile, the formatter 360 may change the format of an image signal. For example, the format of the 3D image signal may be changed to any one format of various 3D formats such as a Side by Side format, a Top/Down format, a Frame Sequential format, an Interlaced format, a Checker Box format.

The processor 330 may control overall operations within the image display apparatus 100 or signal processing device 170.

For example, the processor 330 may control the tuner 110 to select (tuning) an RF broadcast corresponding to a channel selected by a user or a pre-stored channel.

The processor 330 may control the image display apparatus 100 according to a user command input through the user input interface 150 or an internal program.

The processor 330 may perform data transfer control with the network interface 135 or the external device interface 130.

The processor 330 may control operations of the demultiplexer 310 and the image processor 320 within the signal processing device 170.

An audio processor 370 in the signal processing device 170 may voice-process a demultiplexed voice signal. To this end, the audio processor 370 may include various decoders.

The audio processor 370 in the signal processing device 170 may perform processing such as adjustment of bass, treble, and volume.

The data processor (not illustrated) in the signal processing device 170 may perform data processing on a demultiplexed data signal. For example, in case in which the demultiplexed data signal is a coded data signal, the data processor (not illustrated) may decode the data signal. The coded data signal may be electronic program guide information including broadcast information such as a start time and end time of a broadcast program broadcast on each channel.

The block diagram of the signal processing device 170 illustrated in FIG. 3 is a block diagram for one embodiment of the present disclosure. Constituents of the block diagram may be integrated, added, or omitted according to the specifications of the signal processing device 170 which is implemented in reality.

In particular, the frame rate converter 350 and the formatter 360 may be separately provided in addition to the image processor 320.

Figure 4A:
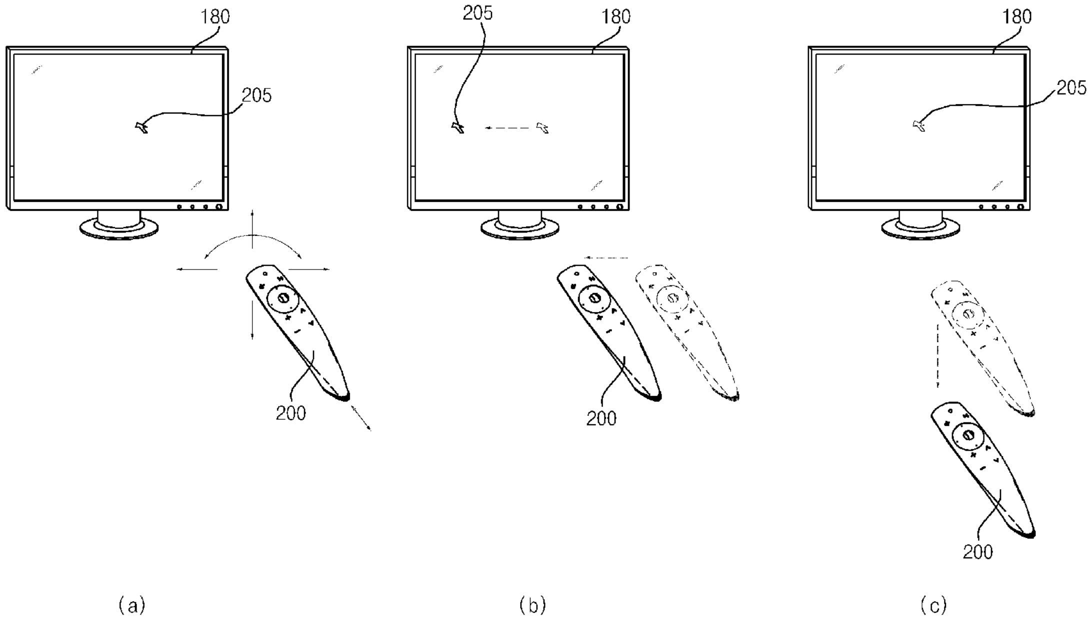
FIG. 4A illustrates a method for controlling a remote controller of FIG. 2.

FIG. 4A illustrates a method for controlling the remote controller of FIG. 2.

As illustrated in FIG. 4A(a), a pointer 205 corresponding to the remote controller 200 may be displayed on the display 180.

The user may move the remote controller 200 up and down, left and right (FIG. 4A(b)), or back and forth (FIG. 4A(c)) or rotate the same. The pointer 205 displayed on the display 180 of the image display apparatus corresponds to movement of the remote controller 200. As illustrated in the drawings, since the pointer 205 moves according to movement of the remote controller 200 in the 3D space, the remote controller 200 may be referred to as a spatial remote control or a 3D pointing device.

FIG. 4A(b) illustrates a case where the pointer 205 displayed on the display 180 of the image display apparatus moves to the left in case in which the user moves the remote controller 200 to the left.

Information about movement of the remote controller 200 sensed through a sensor of the remote controller 200 is transmitted to the image display apparatus. The image display apparatus may calculate coordinates of the pointer 205 based on the information about the movement of the remote controller 200. The image display apparatus may display the pointer 205 such that the pointer 205 corresponds to the calculated coordinates.

FIG. 4A(c) illustrates a case where the user moves the signal processing device 170 away from display 180 in a state where the user presses down a specific button in the remote controller 200. In this case, a selected area on the display 180 corresponding to the pointer 205 may be zoomed in and displayed with the size thereof increased. On the other hand, in case in which the user moves the remote controller 200 closer to the display 180, the selected area in the display 180 corresponding to the pointer 205 may be zoomed out and displayed with the size thereof reduced. Alternatively, the selected area may be zoomed out in case in which the remote controller 200 moves away from the display 180, and may be zoomed in in case in which the remote controller 200 moves closer to the display 180.

Vertical and lateral movement of the remote controller 200 may not be recognized while the specific button in the remote controller 200 is pressed down. That is, in case in which the remote controller 200 approaches or moves away from the display 180, vertical and lateral movements thereof may not be recognized, but back-and-forth movement thereof may be recognized. In case in which the specific button in the remote controller 200 is not pressed down, the pointer 205 only moves according to vertical and lateral movements of the remote controller 200.

The speed and direction of movement of the pointer 205 may correspond to the speed and direction of movement of the remote controller 200.

Figure 4B:
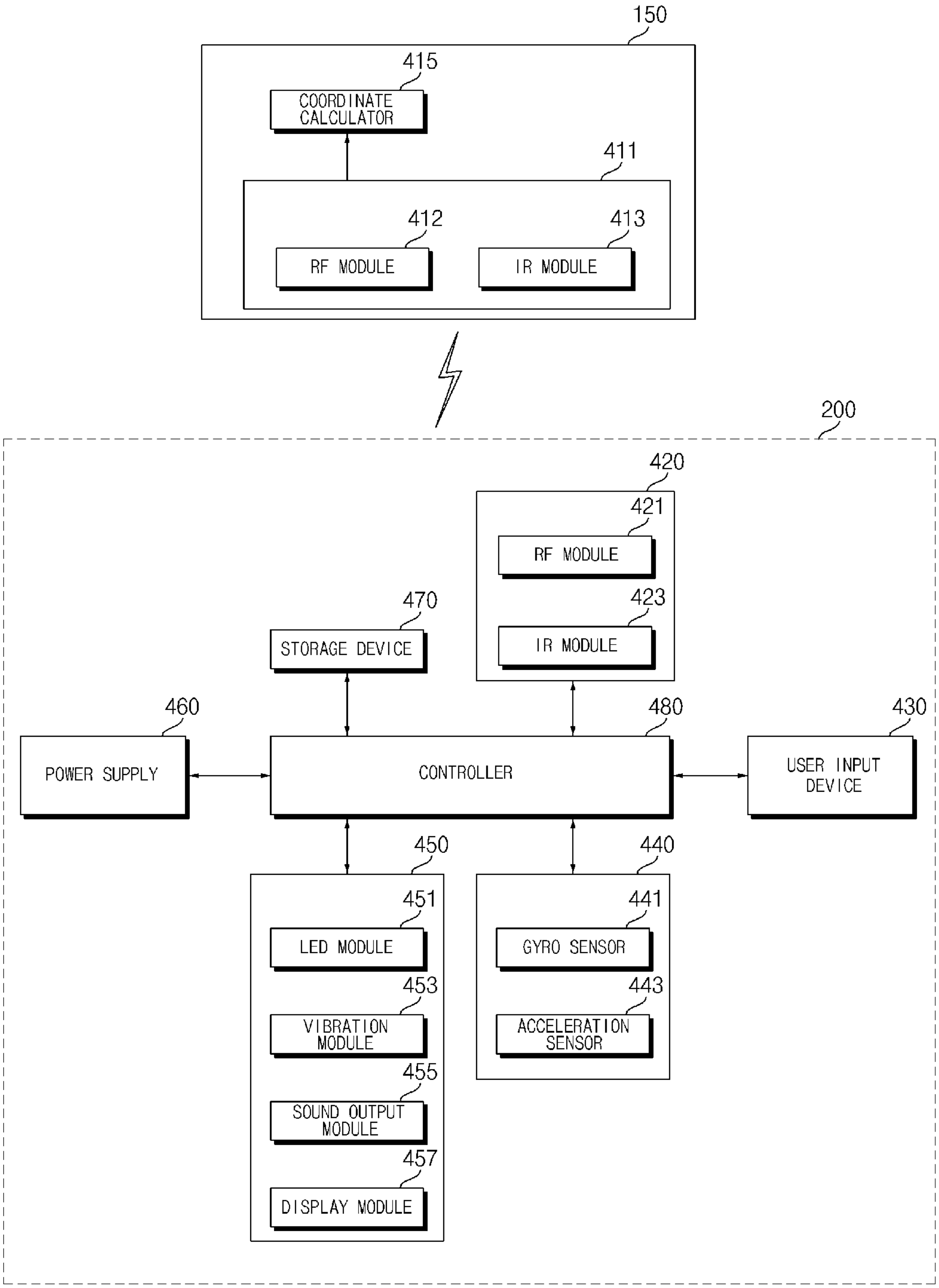
FIG. 4B is an internal block diagram illustrating the remote controller of FIG. 2.

FIG. 4B is an internal block diagram illustrating the remote controller of FIG. 2.

Referring to the drawing, the remote controller 200 may include a wireless transceiver 425, a user input device 430, a sensor device 440, an output device 450, a power supply 460, a storage device 470, and a controller 480.

The wireless transceiver 425 transmits and receives signals to and from one of the image display apparatuses according to embodiments of the present disclosure described above. Hereinafter, one image display apparatus 100 according to one embodiment of the present disclosure will be described.

In this embodiment, the remote controller 200 may include an RF module 421 capable of transmitting and receiving signals to and from the image display apparatus 100 according to an RF communication standard. The remote controller 200 may further include an IR module 423 capable of transmitting and receiving signals to and from the image display apparatus 100 according to an IR communication standard.

In this embodiment, the remote controller 200 transmits a signal including information about movement of the remote controller 200 to the image display apparatus 100 via the RF module 421.

In addition, the remote controller 200 may receive a signal from the image display apparatus 100 via the RF module 421. In case in which necessary, the remote controller 200 may transmit commands related to power on/off, channel change, and volume change to the image display apparatus 100 via the IR module 423.

The user input device 430 may include a keypad, a button, a touchpad, or a touchscreen. The user may input a command related to the image display apparatus 100 with the remote controller 200 by manipulating the user input device 435. In case in which the user input device 435 includes a hard key button, the user may input a command related to the image display apparatus 100 with the remote controller 200 by pressing the hard key button. In case in which the user input device 435 includes a touchscreen, the user may input a command related to the image display apparatus 100 with the remote controller 200 by touching a soft key on the touchscreen. The user input device 430 may include various kinds of input means such as a scroll key and a jog key which are manipulatable by the user, but it should be noted that this embodiment does not limit the scope of the present disclosure.

The sensor device 440 may include a gyro sensor 441 or an acceleration sensor 443. The gyro sensor 441 may sense information about movement of the remote controller 200.

For example, the gyro sensor 441 may sense information about movement of the remote controller 200 with respect to the X, Y and Z axes. The acceleration sensor 443 may sense information about the movement speed of the remote controller 200. The sensor device 440 may further include a distance measurement sensor to sense a distance to the display 180.

The output device 450 may output an image signal or voice signal corresponding to manipulation of the user input device 435 or a signal transmitted from the image display apparatus 100. The user may recognize, via the output device 450, whether the user input device 435 is manipulated or the image display apparatus 100 is controlled.

For example, the output device 450 may include an LED module 451 to be turned on in case in which the user input device 35 is operated or signals are transmitted to and received from the image display apparatus 100 via the wireless transceiver 425, a vibration module 453 to generate vibration, a sound output module 455 to output sound, or a display module 457 to output an image.

The power supply 460 supplies power to the remote controller 200. In case in which the remote controller 200 does not move for a predetermined time, the power supply 460 may stop supplying power to save power. The power supply 460 may resume supply of power in case in which the predetermined key provided to the remote controller 200 is manipulated.

The storage device 470 may store various kinds of programs and application data necessary for control or operation of the remote controller 200. In case in which the remote controller 200 wirelessly transmits and receives signals to and from the image display apparatus 100 via the RF module 421, the remote controller 200 and the image display apparatus 100 may transmit and receive signals in a predetermined frequency band. The controller 480 of the remote controller 200 may store, in the storage device 470, information about, for example, a frequency band enabling wireless transmission and reception of signals to and from the image display apparatus 100 which is paired with the remote controller 200, and reference the same.

The controller 480 controls overall operation related to control of the remote controller 200. The controller 480 may transmit, via the wireless transceiver 425, a signal corresponding to manipulation of a predetermined key in the user input device 435 or a signal corresponding to movement of the remote controller 200 sensed by the sensor device 440 to the image display apparatus 100.

The user input interface 150 of the image display apparatus 100 may include a wireless transceiver 151 capable of wirelessly transmitting and receiving signals to and from the remote controller 200 and a coordinate calculator 415 capable of calculating coordinates of the pointer corresponding to operation of the remote controller 200.

The user input interface 150 may wirelessly transmit and receive signals to and from the remote controller 200 via an RF module 412. In addition, the user input interface 150 may receive, via an IR module 413, a signal transmitted from the remote controller 200 according to an IR communication standard.

The coordinate calculator 415 may calculate coordinates (x, y) of the pointer 205 to be displayed on the display 180, by correcting hand tremor or an error in a signal corresponding to operation of the remote controller 200 which is received via the wireless transceiver 151.

The transmitted signal of the remote controller 200 input to the image display apparatus 100 via the user input interface 150 is transmitted to the signal processing device 170 of the image display apparatus 100. The signal processing device 170 may determine information about an operation of the remote controller 200 or manipulation of a key from the signal transmitted from the remote controller 200, and control the image display apparatus 100 according to the information.

As another example, the remote controller 200 may calculate coordinates of the pointer corresponding to movement thereof and output the same to the user input interface 150 of the image display apparatus 100. In this case, the user input interface 150 of the image display apparatus 100 may transmit, to the signal processing device 170, information about the received coordinates of the pointer without separately correcting hand tremor or the error.

As another example, in contrast with the example of the drawing, the coordinate calculator 415 may be provided in the signal processing device 170 rather than in the user input interface 150.

Figure 5:
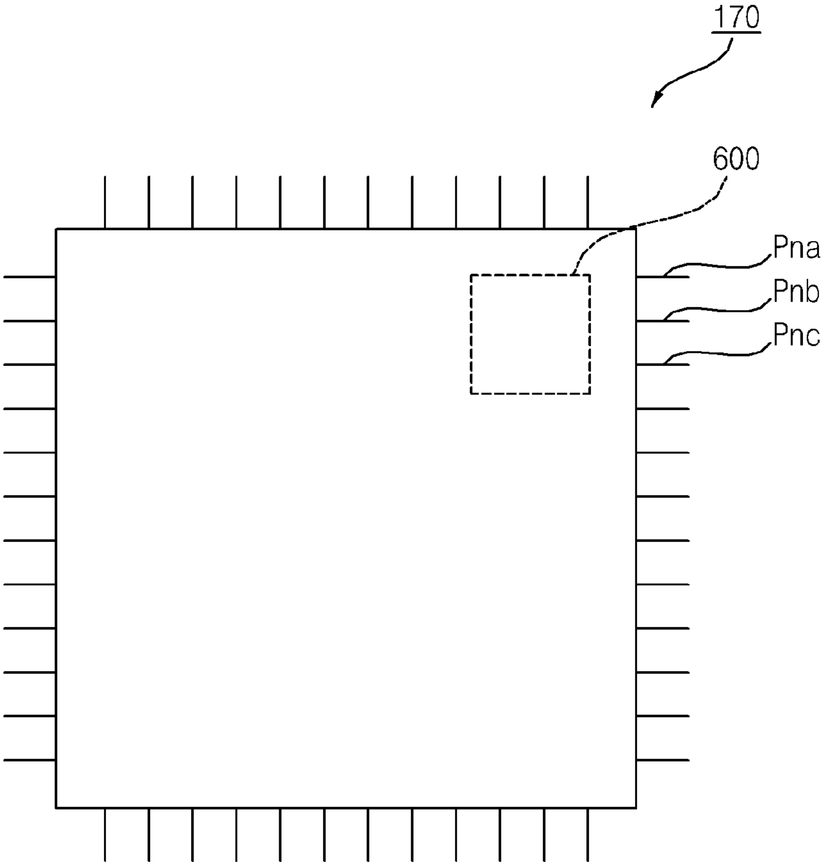
FIG. 5 is a diagram illustrating the appearance of a signal processing device according to an embodiment of the present disclosure.

FIG. 5 is a diagram illustrating the appearance of a signal processing device according to an embodiment of the present disclosure.

Referring to the drawing, the signal processing device 170 in the form of a system-on-chip (SOC) may include a plurality of terminals to transmit or receive signals.

Meanwhile, the signal processing device 170 according to an embodiment of the present disclosure includes the PUF device 600, and some of the plurality of terminals may be used for operation of the PUF device 600.

For example, if the image display apparatus 100 is connected to the external server 300, the access request signal Scn may be output through a first terminal Pna of the signal processing device 170, and the access request signal Scn may be transmitted to the external server 300 via the network interface 135 and the like.

Meanwhile, the authentication request signal Srg received from the external server 300 may be received through the second terminal Pnab of the signal processing device 170.

In response, the encryption key data Srp may be output through a third terminal Pnc of the signal processing device 170, and the encryption key data Srp may be transmitted to the external server 300 via the network interface 135 and the like.

Meanwhile, in case in which authentication based on the encryption key data Srp is completed by the external server 300, the signal processing device 170 may receive information or video data Sst.

Accordingly, information or video data Sst based on the encryption key data Srp may be displayed on the display 180.

Figure 6A:
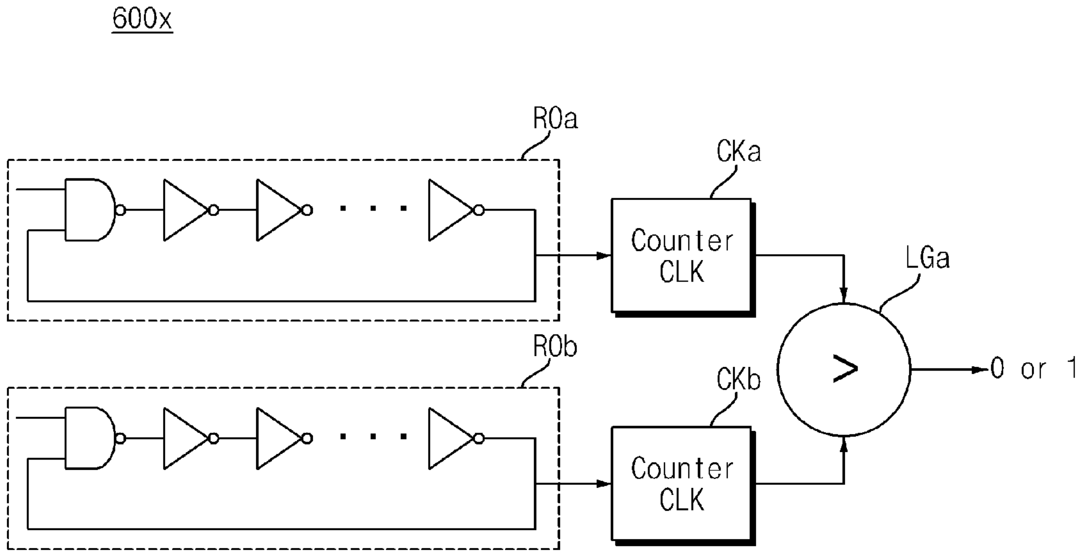
FIGS. 6A and 6B are diagrams illustrating various example of a PUF device associated with the present disclosure.
Figure 6B:
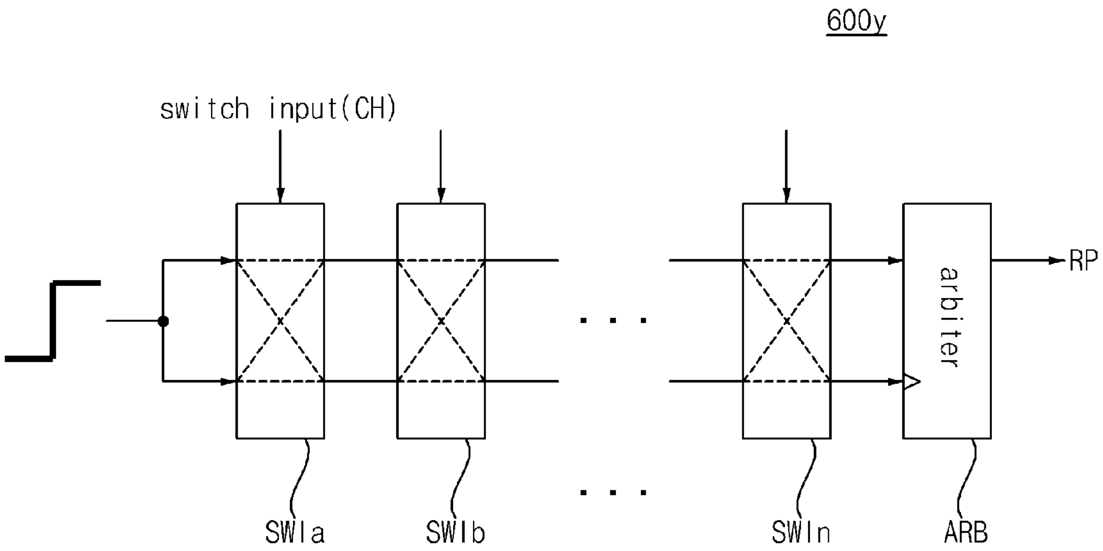

FIGS. 6A and 6B are diagrams illustrating various example of a PUF device associated with the present disclosure.

First, FIG. 6A is a diagram illustrating an example of a PUF device 600*x* associated with the present disclosure.

The PUF device 600*x* associated with the present disclosure may include two ring oscillators ROa and Rob, two counter clocks CKa and CKb, and a logic circuit LGa.

However, in the PUF device 600*x* of FIG. 6A, in case in which external temperature or power voltage changes, bit may be flipped from a high state to a low state, or vice versa.

Further, there is a drawback in that in order to correct the flipped error bit, an additional circuit, such as an Error correction code (ECC) or a non-volatile Memory (NVM), is required.

In addition, there is also a drawback in that in order to cause a delay time difference, a considerable number of inverters are required in the ring oscillators ROa and Rob.

Next, FIG. 6B is a diagram illustrating an example of a PUF device 600*y* associated with the present disclosure.

The PUF device 600*y* associated with the present disclosure may include a plurality of switches SWIa to SWIn and an arbiter ARB.

However, in the PUF device 600*y* of FIG. 6B, in case in which external temperature or power voltage changes, bit may be flipped from a high state to a low state, or vice versa.

Further, there is a drawback in that in order to correct the flipped error bit, an additional circuit, such as an Error correction code (ECC) or a non-volatile Memory (NVM), is required.

Accordingly, the present disclosure proposes a PUF device requiring no separate error correction. Particularly, the present disclosure proposes a PUF device that is anti-fuse-based and requires no separate error correction. Further, the present disclosure proposes a PUF device capable of outputting the same bit constantly even in case in which the external environment changes, which will be described below with reference to FIG. 7 and the following figures.

Figure 7:
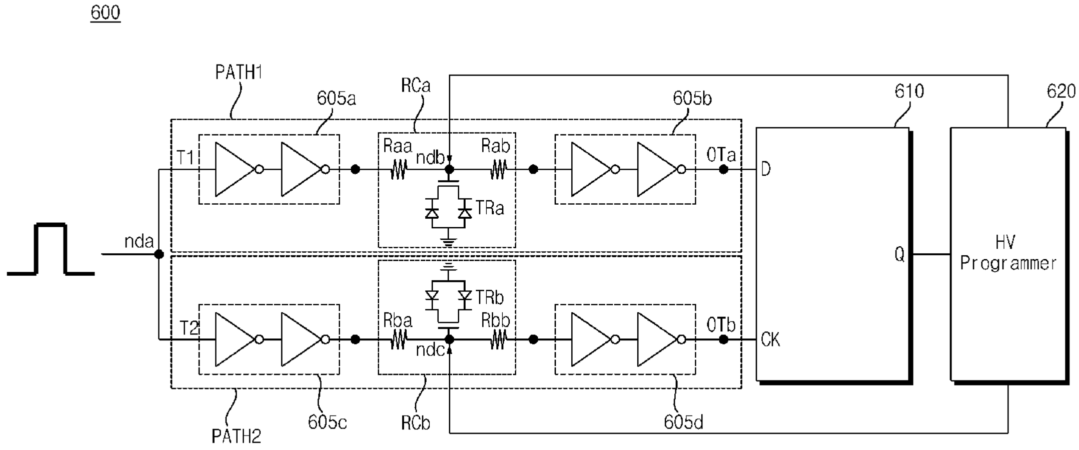
FIG. 7 is an example of a circuit diagram illustrating a PUF device according to an embodiment of the present disclosure.

FIG. 7 is an example of a circuit diagram illustrating a PUF device according to an embodiment of the present disclosure.

Referring to the drawing, the PUF device 600 according to an embodiment of the present disclosure includes a plurality of inverters 605*a* and 605*b* which are disposed on a first path PATH1 and to which a first signal T1 is input, a plurality of inverters 605*c* and 605*d* which are disposed on a second path PATH2 and to which a second signal T2 is input, a first MOS capacitor TRa disposed on the first path PATH1, and a second MOS capacitor TRb disposed on the second path PATH2.

Further, a first voltage V1 is applied to a MOS capacitor disposed on a path corresponding to whichever of the first signal T1 and the second signal T2 arrives later at an output terminal OTa of the first path PATH1 or an output terminal OTb of the second path PATH2.

Accordingly, a PUF device requiring no separate error correction may be implemented. Particularly, a PUF device that is antifuse-based and requires no separate error correction may be implemented.

Meanwhile, the PUF device 600 according to an embodiment of the present disclosure may further include a flip-flop 610 disposed at the output terminal OTa of the first path PATH1 or the output terminal OTb of the second path PATH2, based on the first signal T1 and the second signal T2.

For example, a signal output from the output terminal OTa of the first path PATH1 may be input as an input signal to the flip-flop 610, and a signal output from the output terminal OTb of the second path PATH2 may be input as a clock signal to the flip-flop 610.

Meanwhile, the PUF device 600 according to an embodiment of the present disclosure further includes a voltage output device 620 disposed at an output terminal of the flip-flop 610.

Meanwhile, the voltage output device 600 may supply a first voltage V1, which is a high voltage, to the MOS capacitor disposed on the path corresponding to whichever of the first signal T1 and the second signal T2 arrives later at the output terminal OTa of the first path PATH1 or the output terminal OTb of the second path PATH2.

The PUF device 600 according to an embodiment of the present disclosure may include at least one resistor Raa and Rab disposed on the first path PATH1, and at least one resistor Rba and Rbb disposed on the second path PATH2.

In the drawing, an example is illustrated in which a first resistor Raa and a second resistor Rab are disposed between the first inverter 605*a* and the second inverter 605*b*, and the first MOS capacitor TRa is disposed between a node ndb, which is located between the first resistor Raa and the second resistor Rab, and a ground terminal.

Meanwhile, the first MOS capacitor TRa includes an insulated gate, and in case in which the first voltage V1 which is a high voltage is applied to the insulated gate, a soft breakdown may occur temporarily. Accordingly, in case in which a pulse signal is supplied after the first voltage V1 is applied to the first MOS capacitor TRa, delay of the pulse signal increases further.

In the drawing, an example is illustrated in which a third resistor Rba and a fourth resistor Rbb are disposed between a third inverter 605*c* and a fourth inverter 605*d*, and a second MOS capacitor TRb is disposed between a node ndc, which is located between the third resistor Rba and the fourth resistor Rbb, and a ground terminal.

Meanwhile, the second MOS capacitor TRb includes an insulated gate, and in case in which the first voltage V1 which is a high voltage is applied to the insulated gate, a soft breakdown may occur temporarily. Accordingly, in case in which a pulse signal is supplied after the first voltage V1 is applied to the second MOS capacitor TRb, delay of the pulse signal further increases.

Meanwhile, the first MOS capacitor TRa and the resistors Raa and Rab, which are disposed on the first path PATH1, may constitute a first damping circuit RCa.

Meanwhile, the second MOS capacitor TRb and the resistors Rba and Rbb, which are disposed on the second path PATH2, may constitute a second damping circuit RCb.

The first MOS capacitor TRa and the resistors Raa and Rab in the first damping circuit RCa may cause a delay due to device characteristics.

In addition, the second MOS capacitor TRb and the resistors Rba and Rbb in the second damping circuit RCb may cause a delay due to device characteristics.

Meanwhile, in the drawing, an example is illustrated in which the first inverter 605*a* and the second inverter 605*b* are disposed on the first path PATH1, the first MOS capacitor TRa is disposed between the first inverter 605*a* and the second inverter 605*b*, the third inverter 605*c* and the fourth inverter 605*d* are disposed on the second path PATH 2, and the second MOS capacitor TRb is disposed between the third inverter 605*c* and the fourth inverter 605*d*.

In the present disclosure, a difference in signal delay between the first path PATH1 and the second path PATH2 is used based on a difference between the first MOS capacitor TRa and the second MOS capacitor TRb which have different physical properties due to device characteristics.

Further, a difference in signal delay between the first path PATH1 and the second path PATH2 is used based on a difference between the resistors Raa and Rab on the first path PATH1 and the resistors Rba and Rbb on the second path PATH2 which have different physical properties due to device characteristics.

For example, if the second signal T2 arrives later at the output terminal OTa of the first path PATH1 or the output terminal OTb of the second path PATH2 than the first signal T1, the voltage output device 620 may supply the first voltage V1 to the second MOS capacitor TRb.

Accordingly, damage or antifuse occurs in the second MOS capacitor TRb, thereby temporarily causing a soft breakdown.

Meanwhile, if the second signal T2 arrives later at the output terminal OTa of the first path PATH1 or the output terminal OTb of the second path PATH2 than the first signal T1, the first voltage V1 is supplied to the second MOS capacitor TRb, and after the first voltage V1 is supplied, if the first signal T1 and the second signal T2 are supplied to the first path PATH1 and the second path PATH2, respectively, a difference in time of arrival between the second signal T2 and the first signal T1, which arrive at the output terminal OTa of the first path PATH1 or the output terminal OTb of the second path PATH2, may further increase.

That is, if a difference in time of arrival between the second signal T2 and the first signal T1 is a first level before the first voltage V1 is supplied to the second MOS capacitor TRb, a difference in time of arrival between the second signal T2 and the first signal T1 is a second level, which is greater than the first level, after the first voltage V1 is applied to the second MOS capacitor TRb.

As the difference in time of arrival increases, by applying identical pulse signals to the first signal T1 and the second signal T2, the same bit may be output constantly even in case in which the external environment changes.

Accordingly, the PUF device 600 that is antifuse-based and requires no separate error correction may be provided.

In another example, if the first signal T1 arrives later at the output terminal OTa of the first path PATH1 or the output terminal OTb of the second path PATH2 than the second signal T2, the first voltage V1 may be supplied to the first MOS capacitor TRa.

Accordingly, damage or antifuse occurs in the first MOS capacitor TRa, thereby temporarily causing a soft breakdown.

Meanwhile, if the first signal T1 arrives later at the output terminal OTa of the first path PATH1 or the output terminal OTb of the second path PATH2 than the second signal T2, the first voltage V1 is supplied to the first MOS capacitor TRa, and after the first voltage V1 is supplied, if the first signal T1 and the second signal T2 are supplied to the first path PATH1 and the second path PATH2, respectively, a difference in time of arrival between the second signal T2 and the first signal T1, which arrive at the output terminal OTa of the first path PATH1 or the output terminal OTb of the second path PATH2, may further increase.

That is, if a difference in time of arrival between the second signal T2 and the first signal T1 is a third level before the first voltage V1 is supplied to the first MOS capacitor TRa, a difference in time of arrival between the second signal T2 and the first signal T1 is a fourth level, which is greater than the third level, after the first voltage V1 is applied to the second MOS capacitor TRb.

As the difference in time of arrival increases, by applying identical pulse signals to the first signal T1 and the second signal T2, the same bit may be output constantly even in case in which the external environment changes.

Accordingly, the PUF device 600 that is antifuse-based and requires no separate error correction may be provided.

Meanwhile, in the drawing, an example is illustrated in which the first path PATh1 is formed from a common node nda to the output terminal OTa of the second inverter 605*b*, and the second path PATH2 is formed from the common node nda to the output terminal OTb of the fourth inverter 605*d*.

Accordingly, the signals applied to the first path PATh1 and the second path PATH2 may be identical signals.

That is, the first signal T1 and the second signal T2 may be identical pulse signals.

As described above, by applying identical pulse signals to the first path PATh1 and the second path PATH2, and then using a delay which occurs due to physical properties of the respective circuit elements in the first path PATh1 and the second path PATH2, the PUF device 600 requiring no separate error correction may be implemented.

Meanwhile, the PUF device 600 illustrated in the drawing may be a circuit of any one cell among a plurality of cell circuits, and a plurality of encryption key data may be output for the plurality of cell circuits.

Figure 8:
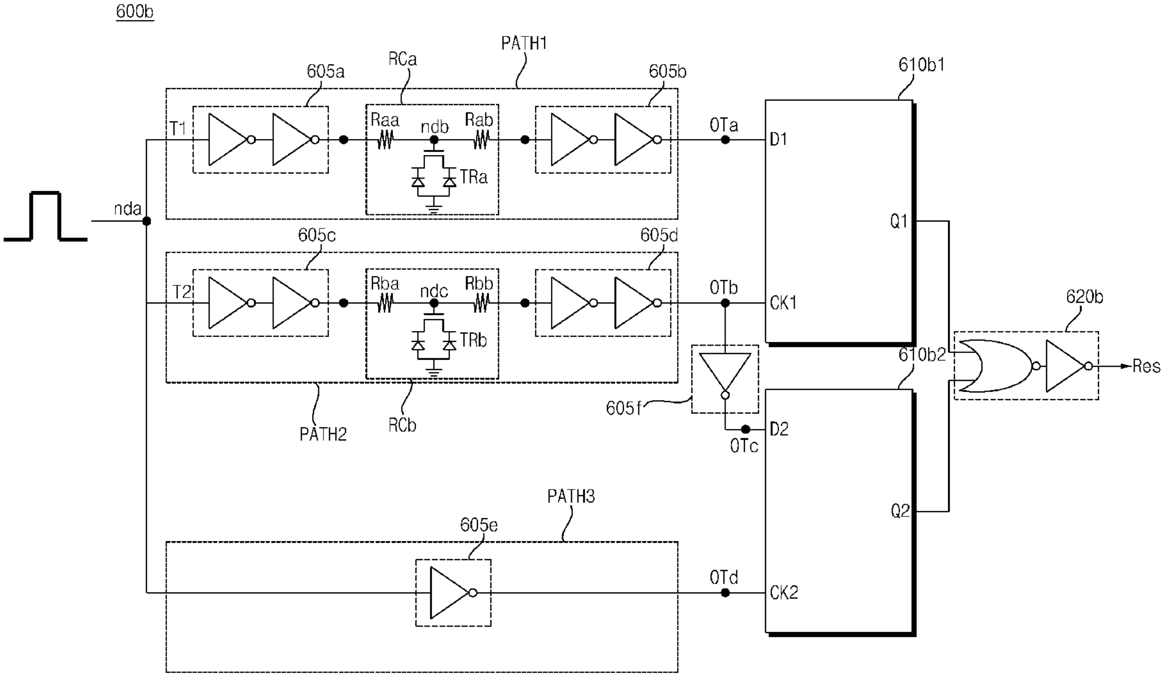
FIG. 8 is an example of a circuit diagram illustrating a PUF device according to another embodiment of the present disclosure.

FIG. 8 is an example of a circuit diagram illustrating a PUF device according to another embodiment of the present disclosure.

Referring to the drawing, the PUF device 600*b* according to another embodiment of the present disclosure includes a plurality of inverters 605*a* and 605*b* which are disposed on a first path PATH1 and to which a first signal T1 is input, a plurality of inverters 605*c* and 605*d* which are disposed on a second path PATH2 and to which a second signal T2 is input, a first MOS capacitor TRa disposed on the first path PATH1, a second MOS capacitor TRb disposed on the second path PATH2, a flip-flop 610*b*1 disposed at an output terminal OTa of the first path PATH1 and an output terminal OTb of the second path PATH2, at least one inverter 605*e* which is disposed on a third path PATH3 and to which a third signal T3 is input, an inverter 605*f* connected to the output terminal OTb of the second path PATH2, a second flip-flop 610*b*2 disposed at an output terminal OTd of the third path PATH3, and an OR gate 620*b* configured to perform a logical operation based on an output signal of the flip-flop 610 and an output signal of the second flip-flop 610*b*2.

Further, a first voltage V1 is applied to a MOS capacitor disposed on a path corresponding to whichever of the first signal T1 and the second signal T2 arrives later at the output terminal OTa of the first path PATH1 or the output terminal OTb of the second path PATH2.

Meanwhile, an output signal of a sixth inverter 605*f* connected to the output terminal OTb of the second path PATH2 is input as an input signal to the second flip-flop 610*b*2, and a signal output from the output terminal OTd of the third path PATH3 is input as a clock signal to the second flip-flop 610*b*2.

For example, a signal output from the output terminal OTa of the first path PATH1 may be input as an input signal to the flip-flop 610*b*1, and a signal output from the output terminal OTb of the second path PATH2 may be input as a clock signal to the flip-flop 610*b*1.

Meanwhile, a first voltage V1, which is a high voltage, may be supplied to the MOS capacitor disposed on the path corresponding to whichever of the first signal T1 and the second signal T2 arrives later at the output terminal OTa of the first path PATH1 or the output terminal OTb of the second path PATH2.

The PUF device 600*b* according to another embodiment of the present disclosure may include at least one resistor Raa and Rab disposed on the first path PATH1, and at least one resistor Rba and Rbb disposed on the second path PATH2.

In the drawing, an example is illustrated in which a first resistor Raa and a second resistor Rab are disposed between the first inverter 605*a* and the second inverter 605*b*, and the first MOS capacitor TRa is disposed between a node ndb, which is located between the first resistor Raa and the second resistor Rab, and a ground terminal.

Meanwhile, the first MOS capacitor TRa includes an insulated gate, and in case in which the first voltage V1 which is a high voltage is applied to the insulated gate, a soft breakdown may occur temporarily. Accordingly, in case in which a pulse signal is supplied after the first voltage V1 is applied to the first MOS capacitor TRa, delay of the pulse signal further increases.

In the drawing, an example is illustrated in which a third resistor Rba and a fourth resistor Rbb are disposed between a third inverter 605*c* and a fourth inverter 605*d*, and a second MOS capacitor TRb is disposed between a node ndc, which is located between the third resistor Rba and the fourth resistor Rbb, and a ground terminal.

Meanwhile, the second MOS capacitor TRb includes an insulated gate, and in case in which the first voltage V1 which is a high voltage is applied to the insulated gate, a soft breakdown may occur temporarily. Accordingly, in case in which a pulse signal is supplied after the first voltage V1 is applied to the second MOS capacitor TRb, delay of the pulse signal further increases.

Meanwhile, the first MOS capacitor TRa and the resistors Raa and Rab, which are disposed on the first path PATH1, may constitute a first damping circuit RCa.

Meanwhile, the second MOS capacitor TRb and the resistors Rba and Rbb, which are disposed on the second path PATH2, may constitute a second damping circuit RCb.

The first MOS capacitor TRa and the resistors Raa and Rab in the first damping circuit RCa may cause a delay due to device characteristics.

In addition, the second MOS capacitor TRb and the resistors Rba and Rbb in the second damping circuit RCb may cause a delay due to device characteristics.

Meanwhile, in the drawing, an example is illustrated in which the first inverter 605*a* and the second inverter 605*b* are disposed on the first path PATH1, the first MOS capacitor TRa is disposed between the first inverter 605*a* and the second inverter 605*b*, the third inverter 605*c* and the fourth inverter 605*d* are disposed on the second path PATH 2, and the second MOS capacitor TRb is disposed between the third inverter 605*c* and the fourth inverter 605*d*.

In the present disclosure, a difference in signal delay between the first path PATH1 and the second path PATH2 is used based on a difference between the first MOS capacitor TRa and the second MOS capacitor TRb which have different physical properties due to device characteristics.

Further, a difference in signal delay between the first path PATH1 and the second path PATH2 is used based on a difference between the resistors Raa and Rab on the first path PATH1 and the resistors Rba and Rbb on the second path PATH2 which have different physical properties due to device characteristics.

For example, if the second signal T2 arrives later at the output terminal OTa of the first path PATH1 or the output terminal OTb of the second path PATH2 than the first signal T1, the first voltage V1 is supplied to the second MOS capacitor TRb.

Accordingly, damage or antifuse occurs in the second MOS capacitor TRb, thereby temporarily causing a soft breakdown.

Meanwhile, if the second signal T2 arrives later at the output terminal OTa of the first path PATH1 or the output terminal OTb of the second path PATH2 than the first signal T1, the first voltage V1 is supplied to the second MOS capacitor TRb, and after the first voltage V1 is supplied, if the first signal T1 and the second signal T2 are supplied to the first path PATH1 and the second path PATH2, respectively, a difference in time of arrival between the second signal T2 and the first signal T1, which arrive at the output terminal OTa of the first path PATH1 or the output terminal OTb of the second path PATH2, may further increase.

In another example, if the first signal T1 arrives later at the output terminal OTa of the first path PATH1 or the output terminal OTb of the second path PATH2 than the second signal T2, the first voltage V1 may be supplied to the first MOS capacitor TRa.

Accordingly, damage or antifuse occurs in the first MOS capacitor TRa, thereby temporarily causing a soft breakdown.

Meanwhile, if the first signal T1 arrives later at the output terminal OTa of the first path PATH1 or the output terminal OTb of the second path PATH2 than the second signal T2, the first voltage V1 is supplied to the first MOS capacitor TRa, and after the first voltage V1 is supplied, if the first signal T1 and the second signal T2 are supplied to the first path PATH1 and the second path PATH2, respectively, a difference in time of arrival between the second signal T2 and the first signal T1, which arrive at the output terminal OTa of the first path PATH1 or the output terminal OTb of the second path PATH2, may further increase.

Meanwhile, the respective inverters may include a plurality of MOS-based switching elements, and may include, for example, an upper switching element and a lower switching element.

Among these, a threshold voltage Vth of MOS-based switching elements in the second inverter 605*b* and a threshold voltage Vth of MOS-based switching elements in the fourth inverter 605*d* may be different from threshold voltages of switching elements of other inverters.

Specifically, the threshold voltage Vth of the MOS-based switching elements in the second inverter 605*b* and the threshold voltage Vth of the MOS-based switching elements in the fourth inverter 605*d* may be greater than threshold voltages of the switching elements of the other inverters. Accordingly, a difference in delay between the second signal T2 and the first signal T1 may further increase.

Meanwhile, in the drawing, an example is illustrated in which the first path PATh1 is formed from a common node nda to the output terminal OTa of the second inverter 605*b*, the second path PATH2 is formed from the common node nda to the output terminal OTb of the fourth inverter 605*d*, and the third path PATH2 is formed from the common node nda to the output terminal OTd of the fifth inverter 605*e*.

Accordingly, the signals applied to the first path PATh1, the second path PATH2, and the third path PATH3 may be identical signals.

That is, the first signal T1, the second signal T2, and the third signal T3 may be identical pulse signals.

As described above, by applying identical pulse signals to the first path PATh1 to the third path PATH3, and then using a delay which occurs due to physical properties of the respective circuit elements in the first path PATh1 and the second path PATH2, the same bit may be output constantly even in case in which the external environment changes. Accordingly, the PUF device 600*b* that is antifuse-based and requires no separate error correction may be provided.

Meanwhile, the PUF device 600*b* illustrated in the drawing may be a circuit of any one cell among a plurality of cell circuits, and a plurality of encryption key data may be output for the plurality of cell circuits.

FIGS. 9A to 12D are diagrams referred to in the description of FIG. 7 or FIG. 8.

Figure 9C:
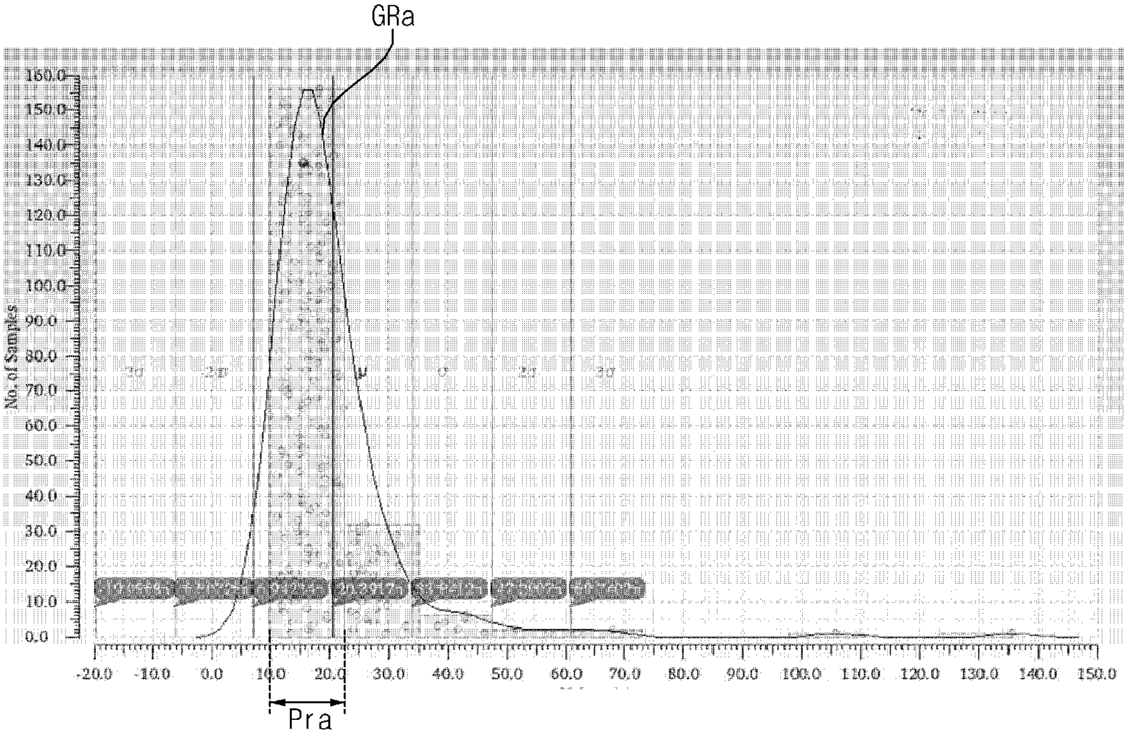
FIGS. 9A to 12D are diagrams referred to in the description of FIG. 7 or FIG. 8.
Figure 9D:
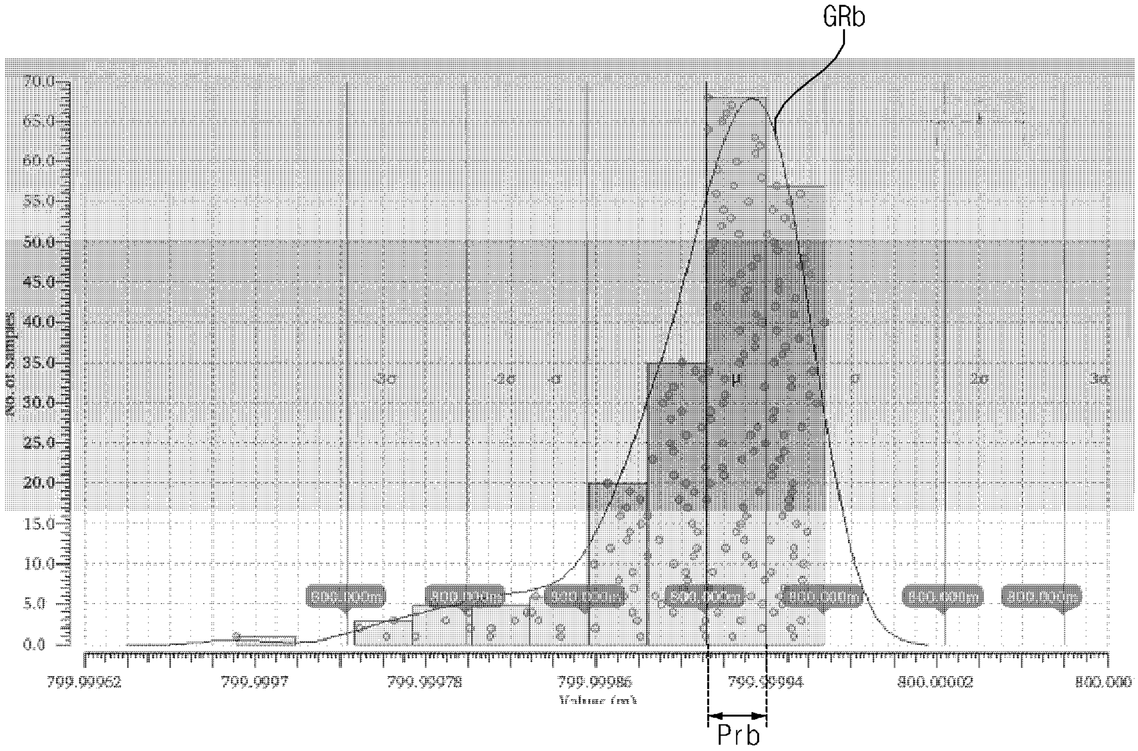

First, FIG. 9A is a diagram referred to in the description of the operation of the PUF device 600 of FIG. 8.

For example, if the flip-flop 610 outputs a random signal after the first voltage V1 is applied to the second MOS capacitor TRb, the OR gate 620*b* may output a logic-operated signal based on an output signal of the second flip-flop 610*b*2.

In another example, if the flip-flop 610 outputs a random signal after the first voltage V1 is applied to the second MOS capacitor TRb, the second flip-flop 610*b*2 may output a high-level signal, and the OR gate 620*b* may output a high-level signal.

In further another example, if the first voltage V1 is applied to the second MOS capacitor TRb, the flip-flop 610 may output a high-level signal, the second flip-flop 610*b*2 may output a low-level signal, and the OR gate 620*b* may output a high-level signal.

In further another example, if the first voltage V1 is applied to the first MOS capacitor TRa, the flip-flop 610 may output a low-level signal, the second flip-flop 610*b*2 may output a low-level signal, and the OR gate 620*b* may output a low-level signal.

Accordingly, the PUF device requiring no separate error correction may be implemented. Particularly, the PUF device that is antifuse-based and requires no separate error correction may be implemented.

Next, FIG. 9B is a diagram illustrating bit error rates with respect to resistance values of the resistors Raa and Rab on the first path PATH1 and an operating voltage change and a temperature change.

Referring to the drawing, if a resistance value of the resistors Raa and Rab is 1 Mohm or 500 Kohm, a bit error rate (BER) is 0% even in case in which the operating voltage Vdd or temperature changes.

However, if a resistance value of the resistors Raa and Rab is 10 Mohm, the bit error rates (BER) are 0.9%, 11.9%, 0.4%, 4%, etc., in case in which the operating voltage Vdd or temperature changes.

Accordingly, the resistors Raa and Rab or the resistors Rba and Rbb, which are used in damping circuits, preferably have a resistance value of 1 Mohm or less.

Figure 12A:
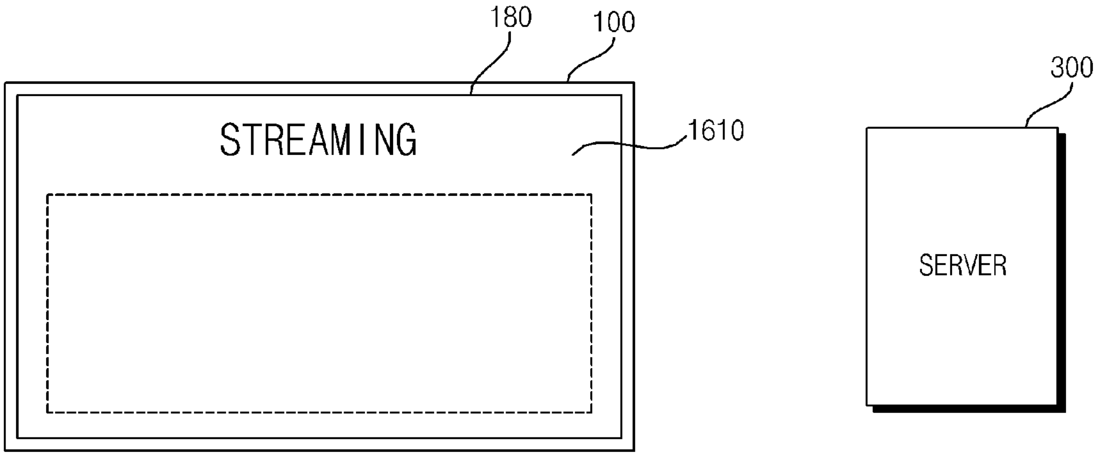

FIG. 12A is a diagram illustrating a bit output graph Gra output by the PUF device 600 of FIG. 7 or the PUF device 600*b* of FIG. 8 in case in which the first voltage is applied to the first MOS capacitor TRa and a soft damage is inflicted.

Referring to the drawing, the bit output graph Gra shows an output probability of 0 V, which is a low level, in case in which the resistors Raa and Rab have a resistance value of 1 Mohm.

A considerably high output probability of 0 V, which is a low level, is shown, and thus a PUF device requiring no separate error correction may be implemented.

Figure 12B:
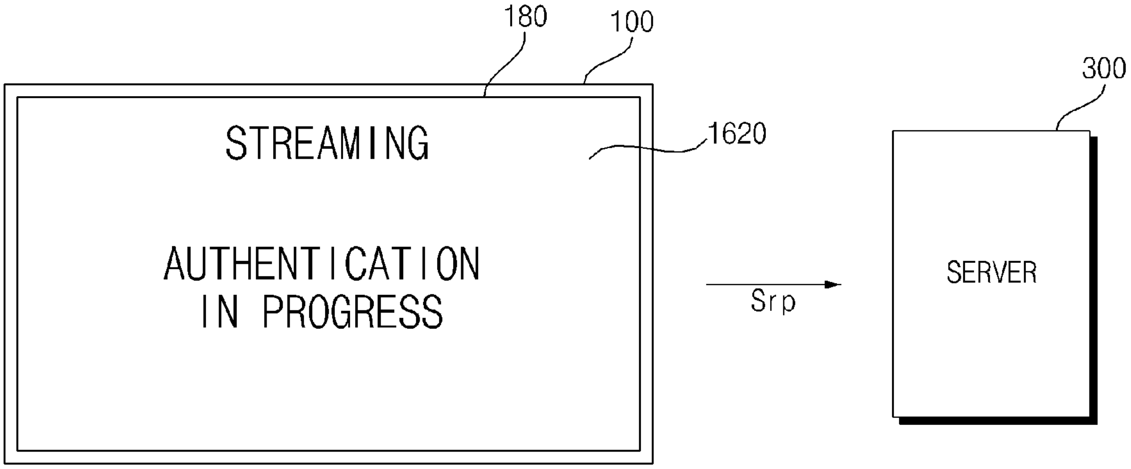

FIG. 12B is a diagram illustrating a bit output graph GRa output by the PUF device 600 of FIG. 7 or the PUF device 600*b* of FIG. 8 in case in which the first voltage is applied to the second MOS capacitor TRb and a soft damage is inflicted.

Referring to the drawing, the bit output graph Grb shows an output probability of 0.8 V, which is a high level, in case in which the resistors Raa and Rab have a resistance value of 1 Mohm.

A considerably high output probability of 0.8 V, which is a high level, is shown, and thus a PUF device requiring no separate error correction may be implemented.

Figure 10:
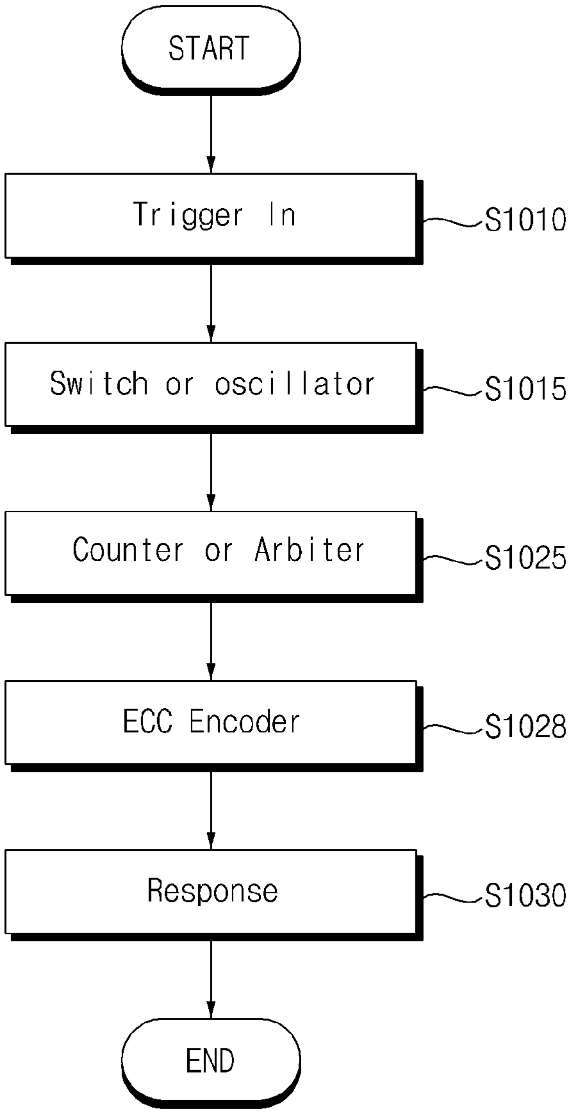

FIG. 10 is a diagram referred to in the description of the operation of the PUF device of FIG. 6A.

Referring to the drawing, a trigger signal is applied (S1010). The trigger signal is applied for the operation of a PUF 600*x*.

Then, a switch or an oscillator is driven (S1015). The trigger signal may be applied to each of the two ring oscillators ROa and ROb.

Next, a counter or an arbiter is activated (S1020). Then, the two counter clocks CKa and CKb and the logic circuit LGa perform a counting operation and an arbiter operation on the trigger signal.

Then, an operation associated with the error correction code is performed (S1028). The operation associated with the error correction code is performed so that the same bit may be output constantly even in case in which the external environment changes. For example, an additional error correction circuit is activated.

Then, an error-corrected code is output (S1030). In response to the operation of the additional error correction circuit, the error-corrected bit is output.

As described above, the PUF device 600*x* of FIG. 6A has a drawback in that in case in which external temperature or power voltage changes, bit may be flipped from a high state to a low state, or vice versa, such that the additional error correction circuit is required separately.

Figure 11A:
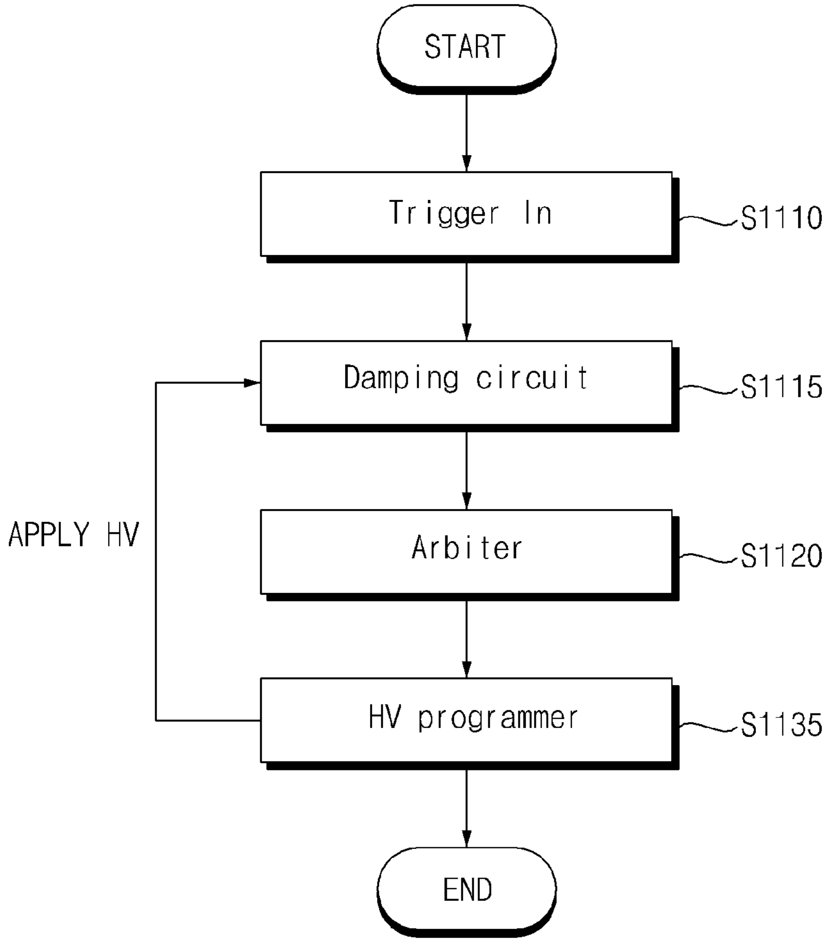

FIG. 11A is a diagram referred to in the description of the operation of the PUF 600 of FIG. 7.

Referring to the drawing, a trigger signal is applied (S1110). The trigger signal is applied for the operation of the PUF 600.

The trigger signal may be a pulse signal, and the first signal T1 and the second signal T2, which are identical pulse signals, are applied to the first path PATH1 and the second PATH2, respectively.

Then, the first damping circuit RCa on the first path PATH1 and the second damping circuit RCb on the second path PATH2 is activated (S1115).

Next, the arbiter is activated (S1120). For example, the flip-flop 610 may perform counting based on the first signal T1 and the second signal T2 or may determine which signal arrives first.

Then, the voltage output device 620 is activated (S1135).

For example, if the second signal T2 arrives later at the output terminal OTa of the first path PATH1 or the output terminal OTb of the second path PATH2 than the first signal T1, the first voltage V1 is supplied to the second MOS capacitor TRb. Accordingly, a soft breakdown may occur temporarily.

In another example, if the first signal T1 arrives later at the output terminal OTa of the first path PATH1 or the output terminal OTb of the second path PATH2 than the second signal T2, the first voltage V1 is supplied to the first MOS capacitor TRa. Accordingly, a soft breakdown may occur temporarily.

Figure 11B:
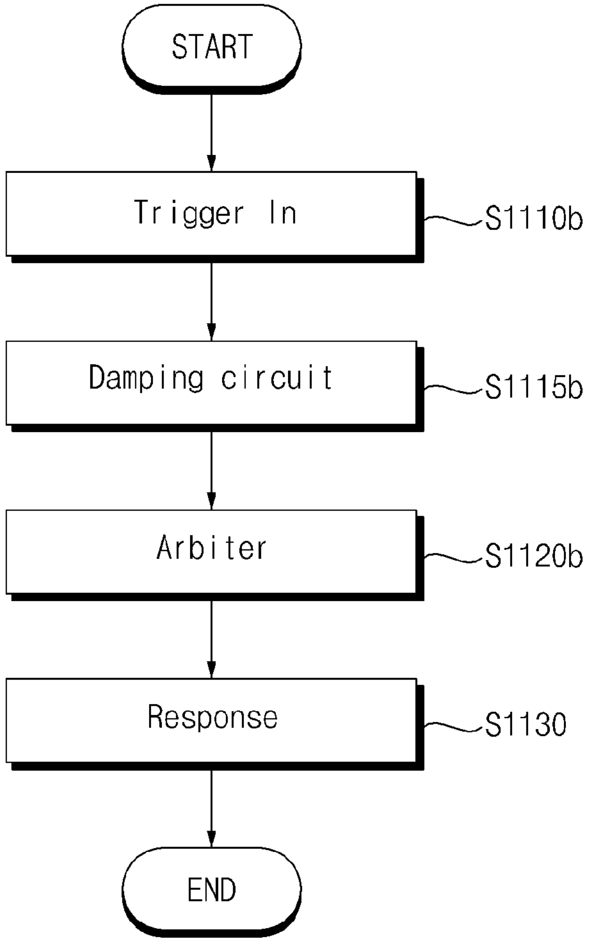

FIG. 11B is a diagram referred to in the description of the operation of the PUF 600*b* of FIG. 8.

Referring to the drawing, a trigger signal is applied (S1110*b*). The trigger signal is applied for the operation of the PUF 600.

The trigger signal may be a pulse signal, and the first signal T1 to the third signal T3, which are identical pulse signals, are applied to the first path PATH1 to the third path PATH3, respectively.

Then, the first damping circuit RCa on the first path PATH1 and the second damping circuit RCb on the second path PATH2 are activated (S1115*b*).

Next, the arbiter is activated (S1120*b*). For example, the flip-flop 610 may perform counting based on the first signal T1 and the second signal T2 or may determine which signal arrives first.

Then, the OR gate 620*b* is activated (S1130). Specifically, the OR gate 620*b* may operate as illustrated in FIG. 10A.

For example, if the flip-flop 610 outputs a random signal after the first voltage V1 is applied to the second MOS capacitor TRb, the OR gate 620*b* may output a logic-operated signal based on an output signal of the second flip-flop 610*b*2.

In another example, if the flip-flop 610 outputs a random signal after the first voltage V1 is applied to the second MOS capacitor TRb, the second flip-flop 610*b*2 may output a high-level signal, and the OR gate 620*b* may output a high-level signal.

In further another example, if the first voltage V1 is applied to the second MOS capacitor TRb, the flip-flop 610 may output a high-level signal, the second flip-flop 610*b*2 may output a low-level signal, and the OR gate 620*b* may output a high-level signal.

In further another example, if the first voltage V1 is applied to the first MOS capacitor TRa, the flip-flop 610 may output a low-level signal, the second flip-flop 610*b*2 may output a low-level signal, and the OR gate 620*b* may output a low-level signal.

Accordingly, the PUF device requiring no separate error correction may be implemented. Particularly, the PUF device 600 that is antifuse-based and requires no separate error correction may be implemented.

FIGS. 12A to 12D are diagrams referred to in the description of the operation of the image display apparatus of FIG. 1.

First, FIG. 12A is a diagram illustrating an example of displaying a video stream start screen 1610 on the image display apparatus 100.

For example, in case in which the image display apparatus 100 is connected to the external server 300 to provide a video streaming service, the image display apparatus 100 may transmit the access request signal Scn to the external server 300, and the external server 300 may transmit the authentication request signal Srg to the image display apparatus 100.

Next, FIG. 12B is a diagram illustrating an example of displaying a screen 1620, indicating that authentication is in progress, on the image display apparatus 100.

Upon receiving the authentication request signal Srg from the server 300, the image display apparatus 100 may transmit the encryption key data Srp to the external server 300. Accordingly, the screen 1620 indicating that authentication is in progress may be displayed on the display 180 of the image display apparatus 100.

Figure 12C:
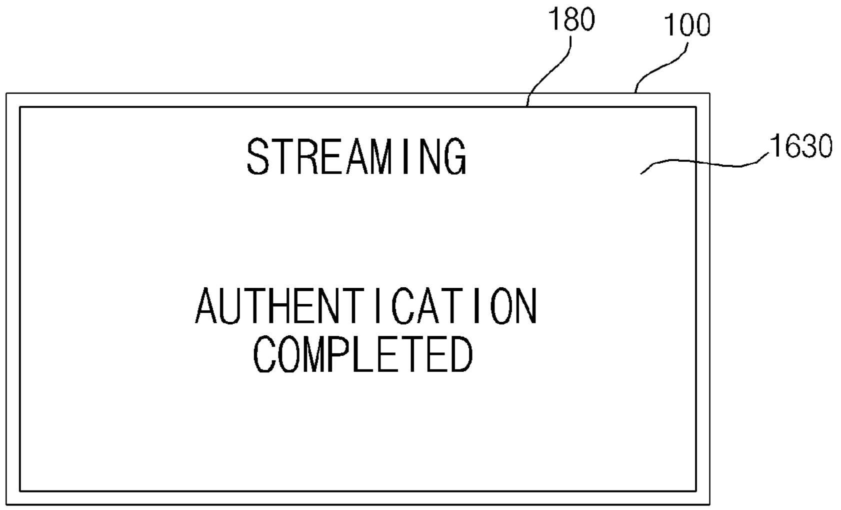

Then, FIG. 12C is a diagram illustrating an example of displaying a screen 1630, indicating that authentication is completed, on the image display apparatus 100.

Upon completing authentication based on the encryption key data Srp, the server 300 may transmit information, indicating that authentication is completed, to the image display apparatus 100.

Accordingly, the screen 1630 indicating that authentication is completed may be displayed on the display 180 of the image display apparatus 100.

Figure 12D:
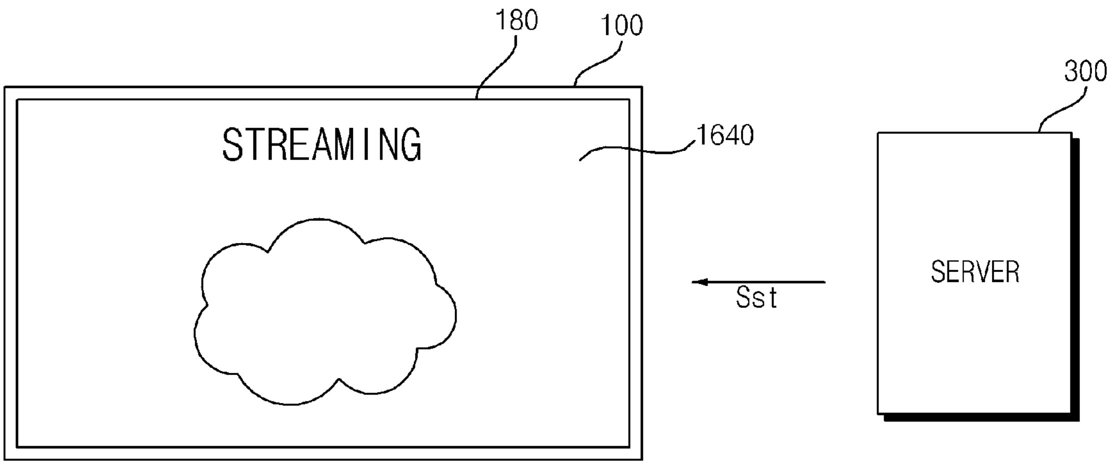

Subsequently, FIG. 12D is a diagram illustrating an example of displaying a video streaming screen 1640 on the image display apparatus 100, after authentication is completed.

In case in which authentication is completed by the server 300, the image display apparatus 100 may receive video stream data and may perform signal processing thereon to control the video streaming screen 1640 to be displayed on the display 180.

Meanwhile, the transmitted encryption key data Srp in FIG. 12B and the like is data to which a physically unclonable function (PUF) based on hardware rather than software is applied, and are preferably data output by the PUF device 600 of FIG. 7 or the PUF device 600*b* of FIG. 8. Accordingly, duplication is impossible, and separate error correction is not required even in case in which external temperature or power voltage changes.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A physically unclonable function (PUF) device comprising:

a plurality of inverters disposed on a first path to which a first signal is input;

a plurality of inverters disposed on a second path to which a second signal is input:

a first MOS capacitor disposed on the first path; and a second MOS capacitor disposed on the second path, wherein a first voltage is applied to the metal-oxide-semiconductor (MOS) capacitor, from among the first MOS capacitor and the second MOS capacitor, disposed on the path, from among the first path and the second path, corresponding to whichever of the first signal and the second signal arrives later at an output terminal of the first path or an output terminal of the second path.

2. The PUF device of claim 1, further comprising a voltage output device configured to supply the first voltage to the MOS capacitor disposed on the path corresponding to whichever of the first signal and the second signal arrives later at the output terminal of the first path or the output terminal of the second path.

3. The PUF device of claim 2, further comprising a flip-flop disposed at the output terminal of the first path and the output terminal of the second path, wherein, based on an output signal of the flip-flop, the voltage output device supplies the first voltage to the MOS capacitor disposed on the path corresponding to whichever of the first signal and the second signal arrives later at the output terminal of the first path or the output terminal of the second path.

4. The PUF device of claim 3, wherein the voltage output device is configured to:

in response to the second signal arriving later at the output terminal of the first path or the output terminal of the second path than the first signal, supply the first voltage to the second MOS capacitor; and in response to the first signal arriving later at the output terminal of the first path or the output terminal of the second path than the second signal, supply the first voltage to the first MOS capacitor.

5. The PUF device of claim 3, wherein in response to the second signal arriving later at the output terminal of the first path or the output terminal of the second path than the first signal, the voltage output device supplies the first voltage to the second MOS capacitor, wherein, after the first voltage is supplied, in response to the first signal and the second signal being supplied to the first path and the second path, respectively, a difference in time of arrival between the second signal and the first signal, which arrive at the output terminal of the first path or the output terminal of the second path, further increases.

6. The PUF device of claim 3, wherein in response to the first signal arriving later at the output terminal of the first path or the output terminal of the second path than the second signal, the voltage output device supplies the first voltage to the first MOS capacitor, wherein, after the first voltage is supplied, in response to the first signal and the second signal being supplied to the first path and the second path, respectively, a difference in time of arrival between the first signal and the second signal, which arrive at the output terminal of the first path or the output terminal of the second path, further increases.

7. The PUF device of claim 1, further comprising:

at least one resistor disposed on the first path; and at least one resistor disposed on the second path.

8. The PUF device of claim 1, wherein the first MOS capacitor is disposed between the plurality of inverters on the first path, and the second MOS capacitor is disposed between the plurality of inverters on the second path.

9. The PUF device of claim 8, wherein:

a first inverter and a second inverter are disposed on the first path, and the first MOS capacitor is disposed between the first inverter and the second inverter; and a third inverter and a fourth inverter are disposed on the second path, and the second MOS capacitor is disposed between the third inverter and the fourth inverter.

10. The PUF device of claim 1, wherein the first signal and the second signal are identical pulse signals.

11. The PUF device of claim 1, further comprising:

a flip-flop disposed at the output terminal of the first path and the output terminal of the second path;

at least one inverter disposed on a third path to which a third signal is input;

a second flip-flop disposed at an output terminal of the third path; and an OR gate configured to perform a logical operation based on an output signal of the flip-flop and an output signal of the second flip-flop.

12. The PUF device of claim 11, wherein:

an output signal of the inverter connected to the output terminal of the second path is input as an input signal to the second flip-flop; and a signal output from the output terminal of the third path is input as a clock signal to the second flip-flop.

13. The PUF device of claim 12, wherein in response to the flip-flop outputting a random signal while the first voltage is applied to the second MOS capacitor, the OR gate outputs a logic-operated signal based on the output signal of the second flip-flop.

14. The PUF device of claim 12, wherein in response to the flip-flop outputting a random signal while the first voltage is applied to the second MOS capacitor, the second flip-flop outputs a high-level signal, and the OR gate outputs a high-level signal.

15. The PUF device of claim 12, wherein after the first voltage is applied to the second MOS capacitor, the flip-flop outputs a high-level signal, the second flip-flop outputs a low-level signal, and the OR gate outputs a high-level signal.

16. The PUF device of claim 12, wherein after the first voltage is applied to the first MOS capacitor, the flip-flop outputs a low-level signal, the second flip-flop outputs a low-level signal, and the OR gate outputs a low-level signal.

17. A physically unclonable function (PUF) device comprising:

a plurality of inverters disposed on a first path to which a first signal is input;

a plurality of inverters disposed on a second path to which a second signal is input;

a first MOS capacitor disposed on the first path;

a second MOS capacitor disposed on the second path;

a flip-flop disposed at an output terminal of the first path and an output terminal of the second path;

at least one inverter disposed on a third path to which a third signal is input;

an inverter connected to the output terminal of the second path;

a second flip-flop disposed at an output terminal of the third path; and an OR gate configured to perform a logical operation based on an output signal of the flip-flop and an output signal of the second flip-flop.

18. The PUF device of claim 17, wherein the first to third signals are identical pulse signals.

19. A signal processing device comprising a physically unclonable function (PUF) device, wherein the PUF device comprising:

a plurality of inverters disposed on a first path to which a first signal is input;

a plurality of inverters disposed on a second path to which a second signal is input;

a first MOS capacitor disposed on the first path; and a second MOS capacitor disposed on the second path, wherein a first voltage is applied to the metal-oxide-semiconductor (MOS) capacitor, from among the first MOS capacitor and the second MOS capacitor, disposed on the path, from among the first path and the second path, corresponding to whichever of the first signal and the second signal arrives later at an output terminal of the first path or an output terminal of the second path.

20. An image display apparatus comprising:

a display; and the signal processing device of claim 19.

* * * * *